United States Patent [19]
Yoshioka et al.

[11] Patent Number: 5,796,978
[45] Date of Patent: Aug. 18, 1998

[54] DATA PROCESSOR HAVING AN ADDRESS TRANSLATION BUFFER OPERABLE WITH VARIABLE PAGE SIZES

[75] Inventors: Shinichi Yoshioka; Ikuya Kawasaki, both of Kodaira; Susumu Narita, Kokubunji; Saneaki Tamaki, Higashimurayama, all of Japan

[73] Assignee: Hitachi, Ltd., Tokyo, Japan

[21] Appl. No.: 524,561

[22] Filed: Sep. 7, 1995

[30] Foreign Application Priority Data

| Sep. 9, 1994 | [JP] | Japan | 6-241993 |
| Mar. 17, 1995 | [JP] | Japan | 7-086068 |
| Aug. 25, 1995 | [JP] | Japan | 7-240871 |

[51] Int. Cl.$^6$ .................................................. G06F 12/10
[52] U.S. Cl. .................... 395/416; 395/455; 395/403; 364/DIG. 1
[58] Field of Search .................... 395/400, 417, 395/445, 460, 416; 364/200

[56] References Cited

U.S. PATENT DOCUMENTS

| 4,084,230 | 4/1978 | Matick | 364/200 |
| 4,525,778 | 6/1985 | Cane | 364/200 |
| 5,123,101 | 6/1992 | Sindhu | 395/400 |
| 5,222,222 | 6/1993 | Mehring et al. | 395/400 |
| 5,263,140 | 11/1993 | Riordan | 395/400 |
| 5,465,337 | 11/1995 | Kong | 395/417 |

OTHER PUBLICATIONS

"Very High Speed MOS Device," published by Baifu-Kan, Ltd., Feb. 10, 1986, pp. 287–288.

*Primary Examiner*—Tod R. Swann
*Assistant Examiner*—David Langjahr
*Attorney, Agent, or Firm*—Alan R. Loudermilk

[57] ABSTRACT

A data processor capable of supporting a plurality of page sizes without increasing the chip occupation area or the power consumption. This data processor for supporting a virtual memory is constructed of a set associative type cache memory having a plurality of banks having their index addresses shared, in which the virtual page size can be set for each page and which includes a TLB to be shared among the plural virtual pages set in various manners. This TLB is provided with a latch field for latching a pair of the virtual page number and the physical page number. The maximum size of the virtual page to be supported is set to the power of two of the minimum size, and the bank number of the TLB is set to no less than the power of two of the former.

30 Claims, 22 Drawing Sheets

FIG. 5

LOGICAL ADDRESS (PAGE SIZE 1KB)

LOGICAL ADDRESS (PAGE SIZE 4KB)

TLB ENTRY

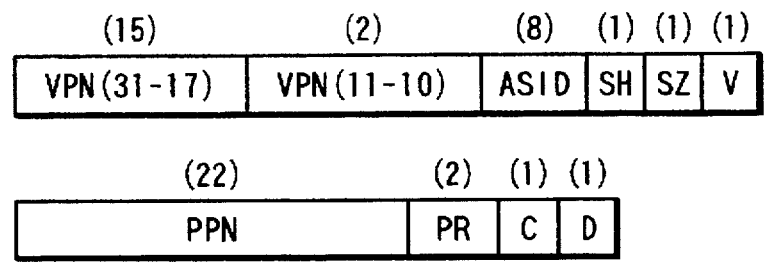

vpn, VPN : Virtual Page Number
ASID      : Address Space Identifier
PPN       : Physical Page Number
V         : Valid; 1=valid, 0=invalid
SH        : Share status bit
            ; 0=page not shared between processes
            ; 1=page shared between processes
D         : Dirty bit, indicates if the page has been written to,
            1=written to, 0=not written to
C         : Cacheable bit
            ; 1=cacheable, 0=non-cacheable
PR        : Protection key field, 2-bit field encoded to define
            the access rights to the page
SZ        : Page size bit
            ; 1=4-KB page, 0=1-KB page

FIG. 6

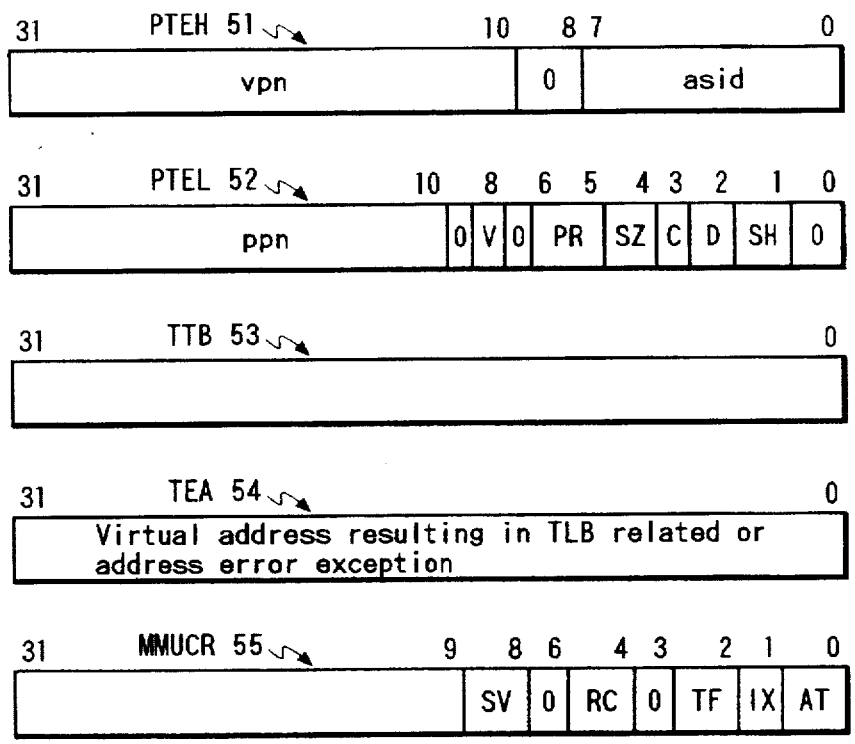

- AT : Address Translation bit ; 1=enable, 0=disamele
- TF : TLB Flush bit ; 1=Flush TLB, 0=no operation and always should be read as 0.
- RC : Random counter field, a 2-bit counter incremented by one every TLB miss by the processor. Software can set required value to this field.
- IX : Index mode bit ; a logic one designates that bits 4-0 of the ASID and bits 16-12 of the VPN are used to index the TLB. a logic zero designates that bits 16-12 of the VPN are used to index the TLB.
- SZ : page size bit ; 1=4-KB page, 0=1-KB page
- SV : Single virtual bit ; 1=single virtual support, 0=Multiple virtual support Mapped ; ADDRESS TRANSLATION BY TLB

FIG. 9

ACCESS RIGHT

| PR | ALLOWED ACCESS | | MEMO |
|---|---|---|---|
| | PRIVILEGED MODE | USER MODE | |
| 00 | READ ONLY | NO ACCESS | PRIVILEGED MODE ONLY |
| 01 | READ/WRITE | NO ACCESS | PRIVILEGED MODE ONLY |
| 10 | READ ONLY | READ ONLY | USER WRITE FAULT |
| 11 | READ/WRITE | READ/WRITE | NORMAL ACCESS |

TLB CONTROL SUBFLOW;
GENERATION OF PHYSICAL ADDRESS pa = PHYSICAL ADDRESS
va = VALID ADDRESS
PPN = PHYSICAL PAGE NUMBER READ FROM TLB

FIG. 19

SINGLE VIRTUAL SUPPORT AND MULTIPLE VIRTUAL SUPPORT

| | SINGLE VIRTUAL SUPPORT | MULTIPLE VIRTUAL SUPPORT |
|---|---|---|
| LOGICAL SPACE | DIVIDED AND USED FOR EVERY PROCESS | USED BY ALL PROCESSES |
| TRANSLATION INFORMATION | ONE EXISTING FOR ALL PROCESSES | EXISTING FOR EVERY PROCESS |
| PROTECTION (USER MODE) | SHARED PAGE ; FOLLOW PR<br>NON-SHARED PAGE ; FOLLOW PR FOR PAGE OF SELF-PROCESS<br>INHIBIT ACCESS FOR PAGE OF OTHER PROCESS | FOLLOW PR |
| PROTECTION (PRIVILEGED MODE) | FOLLOW PR | FOLLOW PR |

PR : PROTECTION INFORMATION CONTAINED IN ADDRESS TRANSLATION INFORMATION IN TLB OR ON MEMORY

FIG. 20(A)
MULTIPLE VIRTUAL SUPPORT
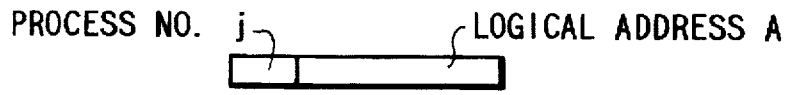
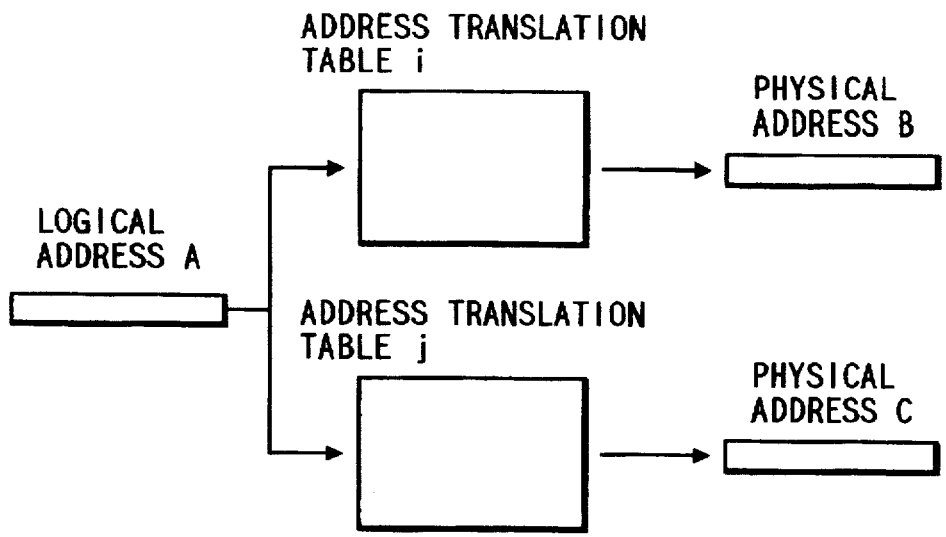
FIG. 20(B)
SINGLE VIRTUAL SUPPORT
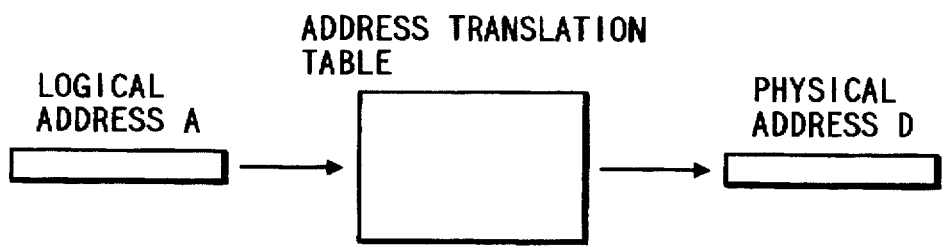

DATA PROCESSOR HAVING AN ADDRESS TRANSLATION BUFFER OPERABLE WITH VARIABLE PAGE SIZES

BACKGROUND OF THE INVENTION

The present invention relates to a data processor having an address translation mechanism and, more particularly, to a data processor having a set associative type cache memory used as the address translation mechanism. More particularly, the present invention is intended to diversify the address translation method and relates to a technique which is effective if applied to a microcomputer.

In the field where the operating system (as will also be referred to as the "SOS"), with the user being unconscious of the real memory, the data processor is required to support the address translation mechanism. This address translation mechanism is a mechanism for translating the logical address generated by the central processing unit (CPU) into a physical address so as to realize a virtual memory. In order to execute this address translation mechanism at a high speed, there is adopted a technique in which a translation lookaside buffer (as will also be shortly referred to as the "TLB") is packaged together with the central processing unit (CPU) in the data processor. The translation lookaside buffer is constructed, for example, as a buffer memory having an associative memory structure for latching a translation pair of the logical address and the physical address, which are recently used. The buffer memory having the associative memory structure can be exemplified by a full associative memory constructed of a CAM (i.e., Content Addressable Memory) having a comparing circuit construction in each memory cell, or a set associative memory capable of realizing a relatively high hit percentage by making use of a general purpose random access memory. Incidentally, the associative memory type translation lookaside buffer is disclosed, for example, on pp. 287 and 288 of "Super-High Speed MOS Device" issued by Kabushiki Gaisha Baifukan on Feb. 10, 1986.

SUMMARY OF THE INVENTION

We have investigated such translation lookaside buffers on the points of satisfying the specifications required by the user and realizing an excellent use convenience and have uncovered the following problems.

(1) In the address translation mechanism supporting a virtual memory, a logical address space is divided into units called the "logical space", and the address translation to the physical address is executed at the page unit. In case of a small total capacity of the real memory (or physical memory) to be actually mounted in a system (packaged), on the other hand, there arises a demand for improving the memory using efficiency for each process by making the virtual page relatively small. Let it be considered that a task to be executed is composed of a program of relatively small size, for example. If the virtual page to be assigned to that task has a relatively large size, the size of the physical page for executing the task is correspondingly enlarged. As a result, a memory space more than necessary is assigned to the task so that the memory using efficiency drops. Especially in case the memory capacity of the real memory is relatively small, it is desired to prevent the using efficiency of the real memory from dropping, by reducing the size of the virtual page. In order to satisfy this desire properly, it is further desired to give the virtual page a variable size. With this variable size, however, there is a change in the number of bits of the information for defining the virtual page in a predetermined logical space. As a result, the number and position of bits of the object information to be compared for retrieving the information associatively from the translation lookaside buffer have to be changed with the virtual page size. In order to cope with this, it is conceivable to adopt the full associative type of the CAM for the translation lookaside buffer. With this adoption, each memory cell is equipped with a comparator so that the virtual page can be relatively easily made variable without any special consideration. Since, however, each memory cell is equipped with the comparator, there is still left a defect that the chip occupation area and the power consumption are doubled, as compared with those of the set associative type translation lookaside buffer.

(2) In the set associative type translation lookaside buffer, the number of entries to be latched for each index address can be increased to improve the hit efficiency if the number of banks or ways existing in a plurality of sets is increased. In the case of a 4-way set associative type, for example, the maximum four entries can be latched for each index address. However, in the case of a multiplex virtual support in which each of the processes has address translation information over the entire field of the logical space so that the logical address is modified or expanded by the address space identifier (a process number), relatively more processes frequently use an identical virtual page if started in parallel. The individual processes are latched in different entries designated by one index address because they have different address space identifiers. Thus, if the number of processes exceeds that of the ways, the hit rate relatively drops even in the set associative type. In the using mode of the multiple virtual support, therefore, in which many processes are started in parallel, it is necessary to make the index method selectable according to the using mode so that the drop in the hit efficiency can be suppressed.

(3) In case a target translation pair is not latched in the translation lookaside buffer, a translation pair (i.e., a desired translation pair) relating to this cache miss is added as a new entry to the translation lookaside buffer. At this time, a replacement of translation pairs is executed if all the translation pairs in an indexed entry are valid. This replacement algorithm is exemplified by the random type, the FIFO type in which the replacement is started from the first loaded one, and the LRU (i.e., Least Recently Used) type in which the replacement is started from the latest referred one. In case the replacement algorithm is fixed, however, the data processing conveniences cannot satisfy in the least the demand for latching a specific translation pair as the entry in the translation lookaside buffer or the demand for preventing the specific address translation pair from being replaced.

(4) The virtual support is exemplified not only by the multiple virtual support described above but also by a single virtual support in which a portion of the logical address space is exclusively assigned to a plurality of processes. It is desirable for improving the using conveniences that these two virtual supports can be selected.

An object of the present invention is to provide a data processor which is equipped with an address translation mechanism capable of satisfying the specifications demanded by the user and having excellent use conveniences.

The object of the present invention will be more specifically described in the following:

To provide a data processor which is equipped with an address translation mechanism capable of supporting a plurality of page sizes without increasing the chip occupation area or the power consumption.

To provide a data processor which is equipped with an address translation mechanism capable of supporting a plurality of index methods and selecting one of them.

To provide a data processor which is equipped with an address translation mechanism capable of giving the degree of freedom to an address translation pair to be replaced.

To provide a data processor which is equipped with an address translation mechanism capable of giving the degree of freedom also to the virtual supports.

The foregoing and other objects and novel features of the present invention will become apparent from the following description to be made with reference to the accompanying drawings.

A representative of the invention to be disclosed herein will be briefly summarized in the following.

<<Support of Plural Page Sizes>>

A data processor supporting virtual memories divides a logical address space into units called the "logical pages" and translates the logical addresses into physical addresses (as called the "address translation"), on each of the logical pages. In this data processor, the size of the logical page is made variable for each page, as exemplified in FIG. 1. A buffer memory 1 such as the translation lookaside buffer is used commonly for a plurality of logical pages each having a variable size. This buffer memory 1 to be used is exemplified by the set associative type cache memory having a plurality of banks 11 to 14 which individually have memory fields for storing corresponding information including logical page numbers VPN and corresponding physical page numbers PPN corresponding to the logical page numbers VPN and which are accessed by a commond index address 2.

The maximum size of the logical pages to be supported is set to the power of two (i.e., the N-th power of two) of the minimum size, and the number of banks of the set associative type buffer memory is set to no less than the power of two (i.e., the N-th power of two). As exemplified in FIG. 1, more specifically, in the logical address space (as designated by logical addresses of bits 0 to 31) of 4 GB (gigabytes), the logical pages have two kinds of sizes of 4 KB (kilobytes) and 1 KB. In this case, the buffer memory 1 includes four banks so that it is constructed into a 4-way set associative type cache memory. In case the logical page size is 4 KB, the offset of the logical address is set to the bits 0 to 11 of the logical address, and a logical page number vpn is set to the bits 12 to 31 of the logical address. In case the logical page address size is 1 KB, the offset of the logical address is set to the bits 0 to 9 of the logical address, and the logical page number vpn is set to the bits 10 to 31 of the logical address. Incidentally, small letters vpn, ppn and asid, as used herein, designate the logical page number, physical page number and address space identifier (process number) to be used for the access and are differentiated from a logical page number VPN, a physical page number PPN and a address space identifier (process number) ASID, as designated by the large letters and used as either the entry of the buffer memory (or the translation lookaside buffer) or the page table entry.

In the translation lookaside buffer described above, according to the method of designating an index address for the buffer memory 1, the sizes of the logical pages are shared for 4 KB and 1 KB, and a predetermined plural bits from the least one in the logical page address of the maximum page size are given as the index address. According to the aforementioned example of FIG. 1, the buffer memory is indexed by using the five bits 12 to 16 in the logical address having the total of 32 bits. With this 5 bits of the index address, thirty two entries at the maximum can be assigned for one bank. In the case of four banks, as in the example of FIG. 1, four entries at the maximum can be assigned for one index address. In the case of the page size of 4 KB, the five bits (i.e., bits 12 to 16) from the least of the logical page number vpn are assigned to the aforementioned index address so that the maximum thirty two entries of an arbitrary virtual page number can be assigned to each bank (accordingly the total of one hundred and twenty eight entries). In the case of the page size of 1 KB, on the other hand, the two bits (i.e., the bits 10 and 11) from the least of the virtual page number vpn are not used for the indexing. Specifically, if the virtual page size is 1 KB and if only the index of one bank is considered, the indexed entry is any of the four virtual page numbers, one of which is to be selected by the two bits (i.e., the bits 10 and 11) left unused for the index. In case, therefore, only one bank is present, only one of the four consecutive-virtual pages can be latched as the entry. In this respect, the maximum size (i.e., 4 KB) of the virtual pages is set to the second power of two of the minimum size (i.e., 1 KB), and the bank number is set to the second power of two (i.e., four). As a whole of the buffer memory (i.e., the translation lookaside buffer), as in the page size of 4 KB, one hundred and twenty eight entries of an arbitrary virtual page number can be assigned as a whole. However, the virtual page number of the entries to be assigned to one bank is subjected to a restriction of every 4 KB. This restriction exerts no influence upon the hit (i.e., TLB hit) rate if the virtual page numbers of the entries assigned to the translation lookaside buffer are consecutive. If these numbers are discrete, the hit rate is influenced to some extent. If, even in this case, the virtual page of 1 KB is subjected to the address mapping for every 2 KB, the influence can be reduced. This influence can be completely eliminated if the address mapping falls at every 4 KB.

In order to decide the TLB hit/miss, the bit number for the address comparison to be reflected upon the hit decision in comparator means 15 provided for each of the banks 11 to 14 has to be changed according to the logical (virtual) page size. According to the example of FIG. 1, the bits 10 and 11 of the logical address have to be compared in the case of the virtual page size of 1 KB, as contrary to the case of the virtual page size of 4 KB. The buffer memory 1 is set with the bit number of the fields for storing the corresponding information (or the translation pair) between the virtual page number and the physical page number so that all the bits to be compared may be covered. The buffer memory 1 is formed for each translation pair with a field indicating the virtual page size to be supported thereby, and the number of bits having addresses to be compared for the hit decision is changed according to the value (or size bit) SZ of the field. The items to have the comparison bit numbers changed are exemplified by both the virtual page number of the logical address and the virtual page number contained in the translation pair in the buffer memory. Reference characters hit1 to hit4 designate hit signals for informing the hit decision results in the individual banks 11 to 14 so that the TLB hit/miss are decided on the basis of the hit signals.

<<Support of Plural Index Methods>>

The data processor for supporting the virtual memory comprises: a buffer memory including a set associative type cache memory having a plurality of banks which individually have memory fields for storing the corresponding informations between virtual page numbers and physical page numbers and which are to be individually accessed by a shared index address; and means for making variable a method of generating index addresses for the buffer memories. For example, in the case of a multiple virtual support in which there are a plurality of processes individually having address translation informations so that they are discriminated by their numbers, either of the method of decoding only a portion (i.e., the bits 12 to 16) of the logical address, as exemplified in FIG. 2, or the method of decoding the result which is obtained by modifying (i.e., XOR=Exclusive OR) a portion (i.e., the bits 12 to 16) of the logical address by a portion of the present process number (asid), as shown in FIG. 3, is indicated as the address designating method for indexing the entry from the buffer memory in accordance with the logical value of a register MMUCR.IX. Incidentally, those informations of the virtual page number VPN contained in the translation pair in the buffer memory 1, which correspond to the vpn (16–12) to be used for the index, are eliminated and designated at VPN (31–17) and VPN (11–10) in FIGS. 3 and 2. Here, the designation of the vpn (16–12) implies the information of the virtual page number containing, the bits 12 to 16 of the logical address. The designation of the VPN (31–17) implies the information of the virtual page number as the entries of the buffer memory corresponding to the bits 17 to 31 of the logical address.

<<Degree of Freedom of Replacement>>

The data processor for supporting the virtual memory comprises the buffer memory 1 including a 4-way set associative type cache memory having the plural banks 11 to 14 which individually have memory fields for latching the corresponding informations between the virtual page number VPN and the physical page number PPN and which have their individual index addresses shared. In case the latched information is to be replaced from those plural banks due to occurrence of a cache miss, the set to be replaced can be arbitrarily designated by executing a software by the central processing unit. For example, the register MMUCR.RC is a register to be set with information of 2 bits for designating the aforementioned banks arbitrarily. When a value set in this register is decoded by a decoder 17, signals BSL1 to BSL4 are generated for selecting one of the four banks 11 to 14. As a result, one of the four banks 11 to 14, as designated by the selecting signals, that is, one entry designated by the index address 2 is a target of replacement. When the value for the bit MMUCR.RC in that register MMUCR is set by the hardware means, the bank designation by this hardware means can be arbitrarily changed by executing the software by the aforementioned central processing unit (CPU).

The aforementioned hardware means is equipped with the register MMUCR.RC as counter means such as a random counter, as shown in FIG. 4. This counter means has the power of two of the bit number equalized to the number (=4) of the banks of the buffer memory 1. A control circuit CTRL contained in the aforementioned hardware means increments the counter means by one, in case the latched information is to be replaced for the buffer memory 1, and sets the incremented result to the bank number to be replaced, in case valid data are also latched in the indexed memory field of any bank (that is, in case each entry of each of the indexed banks has a valid bit V indicating the validity "1"). In case, on the other hand, the valid data are not latched in the indexed memory field (that is, in case each indexed entry has the valid bit V indicating the invalidity "0"), the control circuit CTRL sets the counter means with the number of the bank including the entry latching no valid data. According to this predetermined rule, the bank to be replaced is designated. At this time, each bit of the aforementioned counter means is a target to be changed to an arbitrary value by the software which is executed by the central processing unit.

<<Support of Single Virtual Memory and Multiple Virtual Memory>>

The data processor for supporting the virtual memory comprises an address translation mechanism for dividing the logical address space into units called the "virtual pages" thereby to translate the logical address into the physical address at the page unit. This address translation mechanism comprises: a multiple virtual support for modifying or expanding the logical address for the address space identifier (asid), when each of the processes has an address translation information covering all over the logical space; and a single virtual support for neither modifying nor expanding the logical address for the address space identifier (asid) when a portion of the logical address space is exclusively assigned to the plural processes so that each process has the address translation information of the logical address space assigned thereto. The address translation mechanism can select the multiple virtual support and the single virtual support. As result, each entry in the buffer memory is provided, as shown in FIG. 5, with not only the translation pair of the virtual page number VPN and the physical page number PPN but also the field of the address space identifier ASID. This content of this field is processed differently according to the single virtual support or the multiple virtual support. When the virtual page corresponding to the address space identifier contained in a TLB entry cannot be shared with another process, the content of the field of the address space identifier ASID is used in the multiple virtual support for deciding the retrieval hit/miss (i.e., TLB hit/TLB miss) for the buffer memory. In this case, the TLB hit is not decided if the information of the virtual page number VPN of the entry latched in the buffer memory matches the information of the virtual page address vpn and if the address space identifier ASID of the same entry mismatches the present address space identifier asid. In the single virtual support, the content of the field of the address space identifier ASID is used as the memory protecting information. In this case, when the TLB miss occurs due to the difference in the address space identifier, it is decided by the software which of the difference in the address space identifier or in the virtual page address the miss is caused. In case the miss is caused by the difference in the address space identifier, the miss is treated as the protection error. Which of the aforementioned single virtual support or multiple virtual support is indicated by the value of the bit MMUCR.SV of the register MMUCR, as shown in FIG. 6. The value of this bit MMUCR.SV can be arbitrarily set by the software to be executed by the central processing unit.

Thanks to the construction described above, the following effects can be achieved.

The data processor for supporting the plural page sizes selectively is easily enabled to satisfy the demand for improving the using efficiency of the memory by each process by making the size of the virtual pages relatively small, in case the total memory capacity of the real memory to be packaged in the system is short. If, at this time, the maximum virtual page size is set to the power of two of the minimum size whereas the number of the banks of the set associative type buffer memory is set to the power of two of the same, the entries of the same number of any virtual page number can be latched on principle in the buffer memory independently of the size of the virtual page to be selected, even if the method of designating the index address is made identical to that for the maximum virtual page size. If the bit number of the address comparison to be reflected on the hit decision is changed by using the information for indicating size of the virtual page, the bit number or position of the information to be compared for retrieving the buffer memory associatively can be changed according to the size of the virtual page. If the buffer memory for supporting the plural page sizes is realized by the set associative type cache memory, both the chip occupation area and the power consumption are reduced to halves as large as those of the construction of the CAM.

According to the means for supporting the plural index methods, these methods can be so selected according to the using mode, in which many processes are started in parallel in the multiple virtual support, as to suppress the reduction of the hit rate in the using mode. The reduction of the hit rate in the using mode, in which many processes are started in parallel in the multiple virtual support, can be suppressed by modifying a portion of the logical address with the address space identifier (asid) using the same logical address thereby to index the buffer memory.

According to the means for improving the degree of freedom for the replacement, the bank to be replaced can be arbitrarily decided by the software without fixing the replacement algorithm for replacing the translation pair of the buffer memory As a result, it is possible in the data processing conveniences to satisfy the demand for latching a specific translation pair as the entry in the translation lookaside buffer at all times and the demand for preventing the specific address translation pair from being replaced. The provision of the register for instructing the target of replacement by the software can ensure the degree of freedom for the replacement according to the random, FIFO and LRU types in dependence upon the algorithm of the software.

The means for the single virtual support and the multiple virtual support can improve the using conveniences of the address translation mechanism. These using conveniences can be improved better by selecting either of them through the software. If the address space identifier (ASID) in the multiple virtual support is used as the memory protecting information in the single virtual support, it is easily possible to complete the memory protection in case the single virtual support is selected.

BRIEF DESCRIPTION OF THE DRAWINGS

FIG. 5 is an explanatory diagram for explaining different logical addresses of a page size and examples of the format of the TLB entry for supporting them;

FIG. 6 is an explanatory diagram for explaining examples of various registers for the TLB;

FIG. 9 is an explanatory diagram of an access right to be regulated by a protection bit PR used for memory protection;

FIG. 19 is an explanatory diagram showing the overall differences between the single virtual support and the multiple virtual support;

FIGS. 20(A) and 20(B) are explanatory diagrams showing the concepts of the single virtual support and the multiple virtual support;

DESCRIPTION OF THE PREFERRED EMBODIMENTS

<<Microcomputer>>

Figure 7:
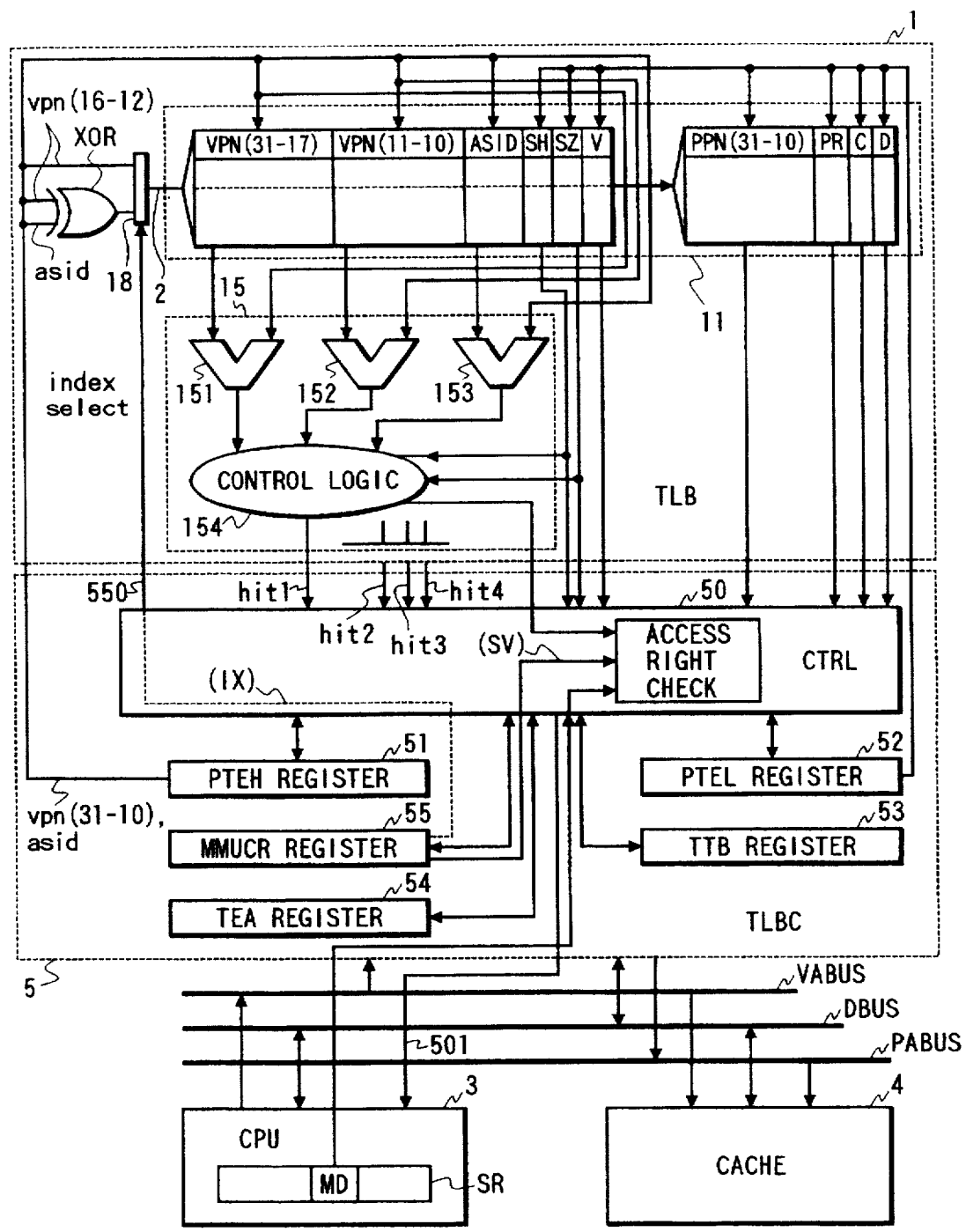
FIG. 7 is an overall block diagram showing an essential portion of the microcomputer according to one embodiment of the present invention.

FIG. 7 shows an essential portion of a microcomputer according to one embodiment of the data processor of the present invention. The microcomputer of the present embodiment is formed over one semiconductor substrate of single crystal silicon by the well-known semiconductor integrated circuit manufacturing technique, although not especially limited thereto. In FIG. 7, there are shown as representative circuit blocks a logical address bus VABUS, a physical address bus PABUS, data bus DBUS, a central processing unit (CPU) 3, a cache memory (CACHE) 4, a translation lookaside buffer (TLB) 1 as the buffer memory, and a TLB controller (TLBC) 5. The CPU 3 fetches an instruction from a not-shown program memory and processes the data in accordance with the description of the instruction. In case an external access is required, the CPU 3 outputs a logical address to the logical address bus VABUS and inputs/outputs the data through the data bus DBUS. The cache memory 4 is exemplified by the 4-way set associative type, although not especially limitative thereto. The band is indexed by using a portion of the logical address fed from the logical address bus VABUS. The physical address is latched in the tag portion of the entry. The tag portion thus indexed has its logical address translated by the translation lookaside buffer 1 and is compared with the physical address outputted to the physical address bus PABUS. The cache miss/hit are decided according to the comparison result.

Figure 1:
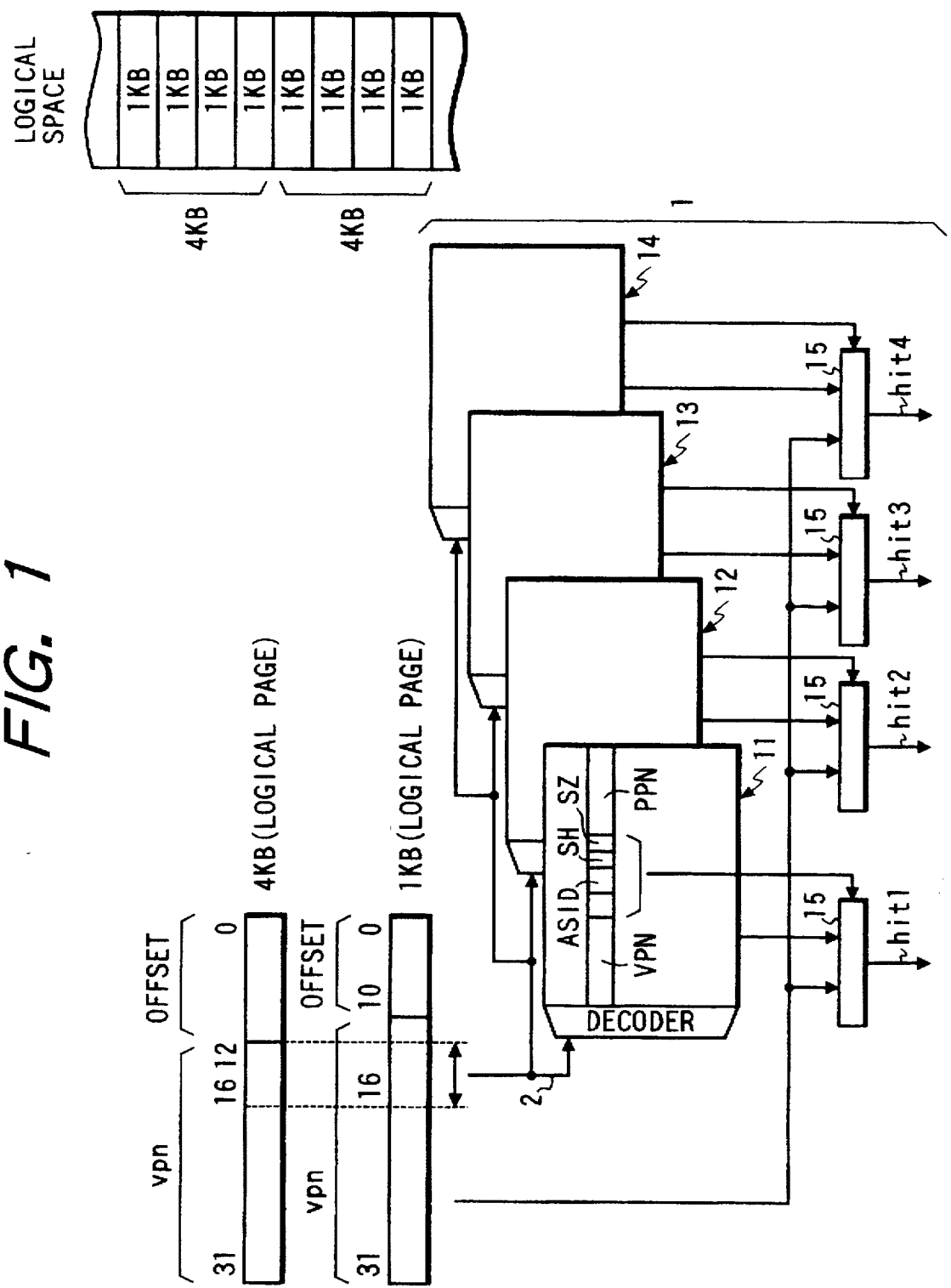
FIG. 1 is an explanatory diagram of a construction for supporting a plurality of page sizes in a microcomputer according to one embodiment of the present invention.

The microcomputer of the present embodiment divides the logical address space into the units called the "virtual page" and supports the virtual memory for the address translation from the logical address into the physical address at the page unit. The aforementioned translation lookaside buffer 1 latches the translation pair between a virtual page number VPN and a corresponding physical page number PPN, as the TLB entry. The TLB controller 5 translates the logical address outputted from the central processing unit 3 into the physical address by using the translation lookaside buffer 1. This translation lookaside buffer 1 is constructed of a 4-way set associative type cache memory having four banks sharing the index addresses. Although only one bank 11 is representatively shown in FIG. 7 so as to avoid the complex illustrations, other banks 12 to 14 like the bank 11 are actually arranged in the direction to and from the drawing, as shown in FIG. 1. The address translation mechanism for the aforementioned virtual support is constructed of the aforementioned translation lookaside buffer 1, TLB controller 5 and CPU 3 and the system software or operating system for the address translation and the memory protection.

Figure 8A:
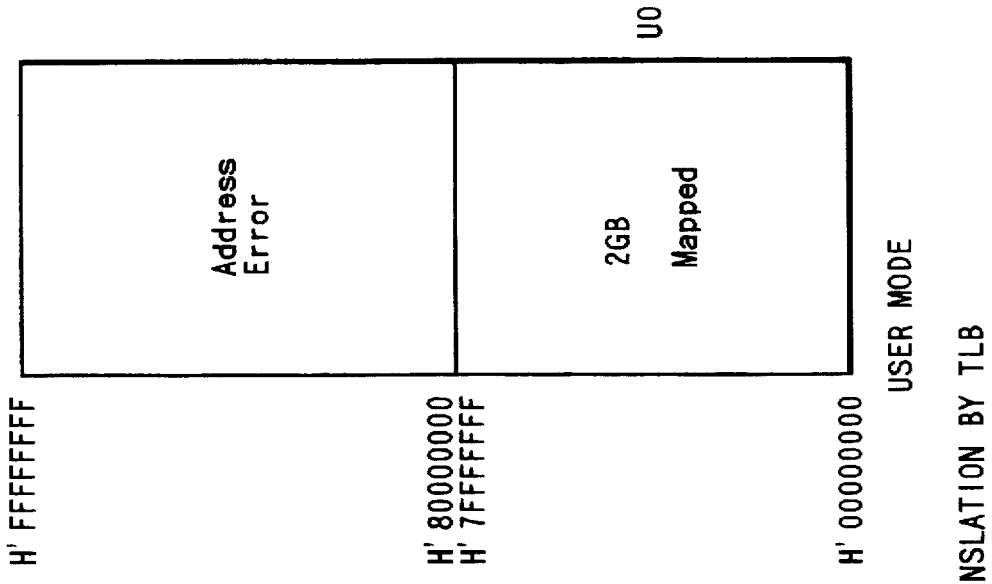
FIGS. 8(A) and 8(B) are explanatory diagrams for explaining an address map to be supported by the microcomputer of the present embodiment.
Figure 8B:
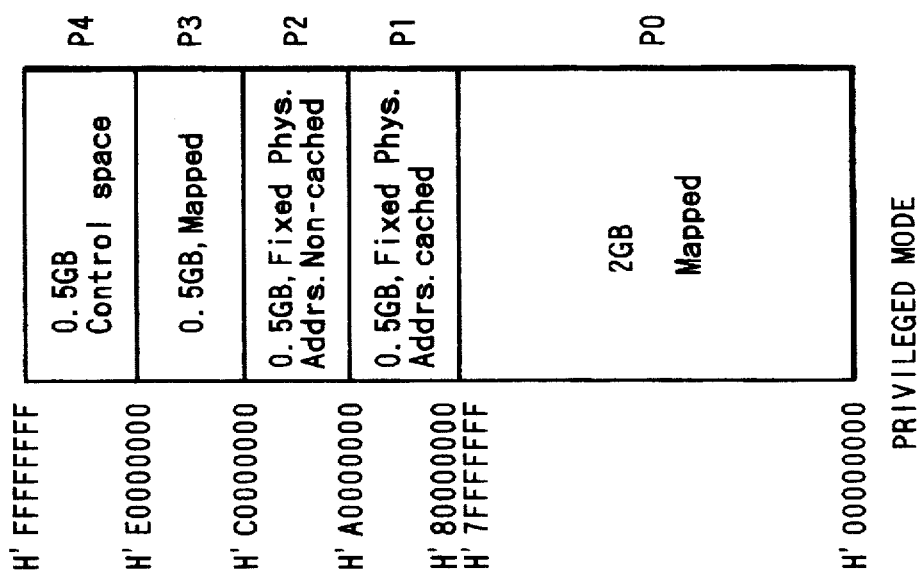

Here will be described in advance the address space of the microcomputer of the present embodiment. In the microcomputer of the present embodiment, the central processing unit 3 forms a logical address of 32 bits so as to support the logical address space of 4 GB. The logical address is made expandable by the later-described address space identifier (or space identifier) asid. In FIGS. 8(A) and 8(B), there is illustrated the address mapping of the logical address space which is supported. In these Figures, the fields, as "Mapped", are those to be subjected to the address translation making use of the translation lookaside buffer (TLB) 1. The fields H'FFFFFFFF (wherein H' designates a hexadecimal notation) to H'80000000 can be accessed in the privileged mode and decided as the address error if accessed in the user mode. A P4 field is a control space which is mapped with a peripheral control register. P1 and P2 fields are those, in which the corresponding physical addresses are fixed, and are not subjected to the address translation using the translation lookaside buffer 1. These fields P1 and P2 have their logical addresses translated into physical addresses by adding or subtracting a predetermined constant. In the privileged mode, therefore, no exception relating to the address translation, as started from the TLB miss, is made if the fields P1 and P2 are accessed. Especially, the P2 field is not cached by the cache memory CACHE, but the P1 field is not cached.

The microcomputer of the present embodiment has the privileged mode and the user mode, as described above, and it is indicated by the value of the mode bit MD of a status register SR contained in the central processing unit 3 whether the microcomputer is operating in the privileged mode or the user mode. The operation in the user mode is indicated by MD=0, and the operation in the privileged mode is indicated by MD=1. In the privileged status (as set in the privileged mode), as shown in FIG. 8(A) and (B)it is possible to access the address space (from P1 to P4) which will cause the address error if accessed in the user status (as set in the user mode) so that the privileged instruction or system control instruction, as cannot be executed in the user status, can be executed, as different from the user status.

In the logical address space of 4 GB, as shown in FIGS. 8(A) and 8(B), the P0 field and the P3 field are plurally divided at the unit called the virtual page, so that the logical address is translated into the physical address at the unit of the divided pages, although not especially limitative thereto. The virtual pages to be supported by the microcomputer of the present embodiment have two kinds of 4 KB and 1 KB.

This satisfies the relation that the maximum size (=4 KB) of the virtual pages to be supported is set to the power of two whereas the number (=4) of the banks of the translation lookaside buffer 1 is no less than the power of two of the former. In case the virtual page size is 1 KB, as shown in FIG. 5, in the logical addresses (i.e., the addresses of 32 bits from the bit 0 to the bit 31) to be generated by the central processing unit, the bits 0 to 9 are offset whereas the bits 10 to 31 are set to the virtual page numbers (or the virtual page addresses). In case the virtual page size is 4 KB, in the logical addresses, the bits 0 to 11 are offset whereas the bits 12 to 31 are set to the virtual page numbers (or the virtual page addresses). The index for the translation lookaside buffer 1 is exemplified the information of the bit positions of the less significant five bits of the virtual page addresses of the page size of 4 KB, that is, the bits 12 to 16 of the logical addresses of 32 bits no matter whether the page size might be 4 KB or 1 KB. In the case of translation from the logical address into the physical address, the physical addresses are acquired by acquiring the physical page number from the entry corresponding to the virtual page number of the logical address and by adding the offset information of the logical address to the less significant side of the physical page number.

If a TLB miss occurs, the information (i.e., the page table entry) to be fetched by the entry in the translation lookaside buffer 1 is generated in advance by the software and is latched in the external memory (e.g., the memory RAM of FIG. 22) which is omitted from FIG. 7. Specifically, the page table entry for the virtual memory includes the description of the translation information indicating the correspondence between the virtual page number VPN and the physical page number PPN or the attributes of the access and is latched in the page table which is formed in the external memory. For a fast address translation, the entry latched in the page table is partially latched in the banks 11 to 14 of the aforementioned TLB 1. The addresses of the page table in the external memory are set in advance in the translation table register (TTB), as will be described with reference to FIG. 6. If a TLB miss occurs, the base address set in the translation tale register 53 and the virtual page number at the time of the miss are used by the CPU 3 to access the aforementioned page table thereby to determine the entry containing the physical page number corresponding to the virtual page number at that time. The entry thus determined is written to the bank in the TLB 1, for example. As a result, the physical address corresponding to the logical address at that time is generated.

The entry to be latched in each bank of the TLB 1 is conveniently divided into an address part and a data part, as shown in detail in FIG. 5. The address part is composed of the informations VPN (31–17) and VPN (11–10) of the virtual page number, a valid bit V (of 1 bit) indicating the validity of the entry, a space identifier ASID (of 8 bits), a size bit SZ (of 1 bit), and a share status SH (of 1 bit). The data part is composed of a protection PR (of 2 bits) for memory protection, the physical page number PPN (of 22 bits) corresponding to the virtual page number, a dirty bit D (of 1 bit), and a cacheable bit C (of 1 bit). The informations of the virtual page numbers latched by the address part are the bits 10 to 11 and the bits 17 to 31 of the logical addresses of 32 bits, from which the bits to be used for indexing the bit format are excluded. The former bits are expressed by the VPN (11–10) whereas the latter bits are expressed by the VPN (31–17). The share status SH indicates whether or not the corresponding page is shared among the plural processes, and the non-share status is indicated by SH=0 whereas the share status is indicated by SH=1. The space identifier ASID is used as belongs to a specific process to define the virtual page, and will also be called the "address space identifier". The protection PR is the data which are encoded to define the access right for the page, and the access right is defined in the modes shown in FIG. 9 by combining its values. The size bit SZ is a bit for designating the virtual page size, and the page size of 4 KB is designated by the logical value 1 whereas the page size of 1 KB is designated by the logical value 0.

Here will be described the concepts of the single virtual support and the multiple virtual support with reference to FIGS. 20(A) and 20(B). The multiple virtual support is defined to modify or expand the logical address by the address space identifier asid when each of the plural processes has the address translation information covering all over the logical space. In the single-virtual support, on the contrary, a portion of the logical address space is exclusively assigned to the plural processes. In other words, the single virtual support is defined to neither modify nor expand the logical address by the address space identifier asid when each process has the address translation information of the logical address spaced assigned thereto. Thus in the single virtual support, the logical address space is exclusively assigned among the plural processes so that each logical address space assigned to the process has its intrinsic address translation information, as shown in FIG. 20(B). This allows only one address translation table to exist. By using this one address translation table, a certain logical address A is uniquely translated into a corresponding physical address D. In the multiple virtual support, on the other hand, the logical address space is assigned in a mutually overlapping manner among the plural processes. Hence, the address translation informations for the individual processes have to be contained in the mutually different address translation tables. As a result, the logical address A is transformed into different physical addresses B and C through mutually different address translation tables i and j. At this time, it is discriminated by the address space identifier which process the logical address A to be translated belongs to. In the multiple virtual support, according to FIG. 20(A), the address translation table i corresponds to the address space identifier i whereas the address translation table j corresponds to the address space identifier j. These address space identifiers can be deemed as the discrimination numbers in the plural processes using (or accessing) a mutually identical logical address space. FIG. 19 illustrates the differences between the single virtual support and the multiple virtual support as to the logical space, the translation information and the protection. In FIG. 19, letters PR designate the protection information, as shown in FIG. 9.

In FIG. 7, the aforementioned TLB controller 5 includes a controller (CTRL) 50, a page table entry high (PTEH) register 51, a page table entry low (PTEL) register 52, a translation table base (TTB) register 53, a TLB exception address (TEA) register 54, and a control (MMUCR) register 55. These registers are coupled to the CPU 3, as will be described with reference to FIG. 22. Of these, at least the TEA register 54 and the MMUCR register 55 can be directly read/written by the CPU 3. The remaining registers 51 to 53 can also be accessed by the CPU 3.

As shown in FIG. 6, the PTEH register 51 and the PTEL register 52 are provided with the field which can latch the page table entry for updating or adding the entry of the TLB 1 at the time of a TLB miss. The PTEH register 51 is set with the space identifier asid of the present process from the central processing unit 3 by executing the software.

Figure 2:
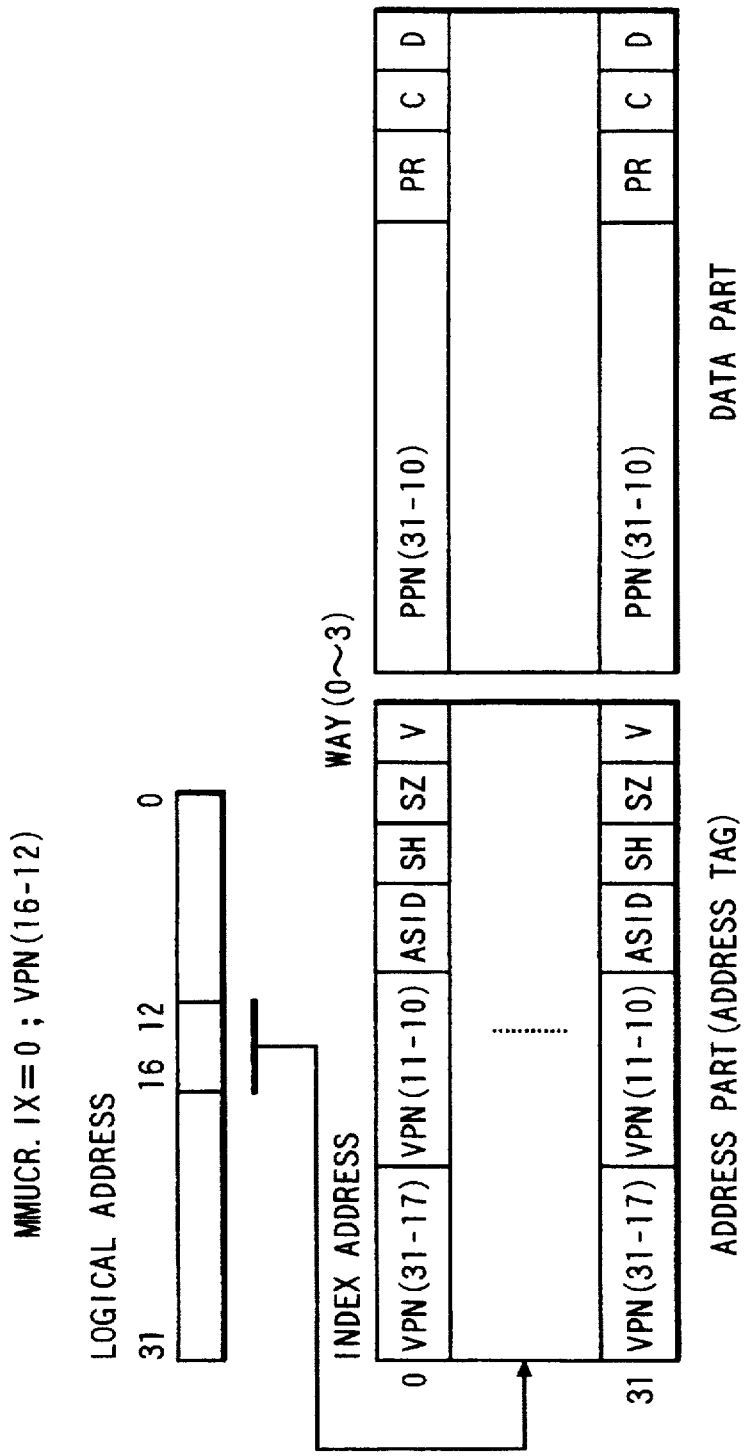
FIG. 2 is an explanatory diagram of a method of indexing a TLB by using a portion of a virtual page address as it is.
Figure 3:
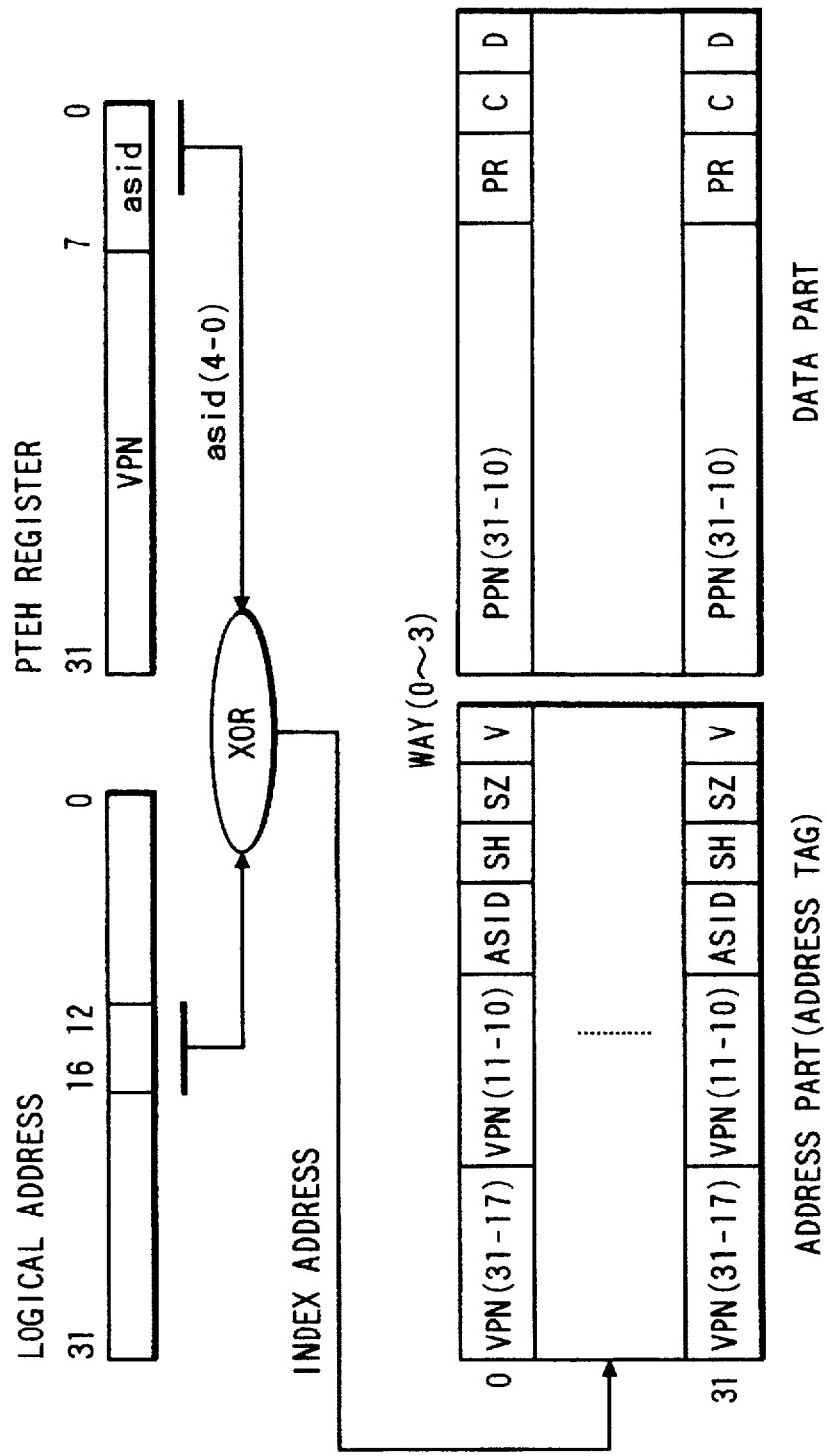
FIG. 3 is an explanatory diagram of a method of indexing the TLB by using a portion of the virtual page address and a portion of a address space identifier.

Moreover, the PTEH register 51 is also given a function to latch the virtual page address vpn of the TLB miss outputted by the CPU 3, if the TLB miss occurs. The offset of the logical address outputted from the CPU 3 is latched in the not-shown latch circuit in the CTRL 50. The base address of the present page table is latched in the TTB register 53. The TEA register 54 latches the logical address when an exception to the TLB or an address error exception occurs. The MMUCR register 55 contains: a bit AT (which is valid for the logical value 1 and invalid for the logical value 0) instructing whether the address translation is to be validated or invalidated; a bit TF instructing the flushing of the TLB 1; a random counter field RC of 2 bits; an index mode bit IX for designating the index mode; and a single virtual bit SV (for selecting the single virtual support for SV=1 and the multiple virtual support for SV=0) for instructing which of the single virtual support or the multiple virtual support is to be selected. In case the aforementioned index mode bit IX is at 1, there is selected the index method using the asid (4–0), i.e., the bits 0 to 4 of the present space identifier asid and the bits 12 to 16 of the virtual page number vpn being outputted from the central processing unit 3, as shown in FIG. 3. In the case of IX=0, on the contrary, there is selected the index method using the bits 12 to 16 of the virtual page number vpn being outputted from the central processing unit 3, as shown in FIG. 2. More specifically, the index address for the case of IX=1 is generated by an exclusive OR gate XOR inputting the bits 0 to 4 of the space identifier asid owned by the PTEH register 51 and the bits 12 to 16 of the virtual page number vpn being outputted from the CPU 3, i.e., the vpn (16–12), as shown in FIG. 7. A selector 18 of FIG. 7 selects either the output hashed by the exclusive OR gate XOR or the vpn (16–12) as the indexing address. The control for this selection is determined according to the value of the index mode bit IX by the select signal 550 outputted from the CTRL 50.

Of the virtual page numbers vpn (31–10) of the logical addresses outputted from the CPU 3, as shown in FIG. 7, the vpn (16–12) corresponding to the bits 12 to 16 are used to generate the index address 2 shared among the four banks 11 to 14 in the TLB. Since the virtual page number is expressed by 5 bits, as described above, the thirty two entries of each banks are selected and read out one by one by the shared index address 2. Each of the entries to be selected contains, as its information, the VPN (31–17), the VPN (11–10), the ASID, the SH, the SZ, the V, the PPN (31–10), the PR, the C and the D. Of the informations of the entries selected and read out: the read VPN (31–17) are compared by a comparator 151 with the vpn (31–17) of the logical addresses outputted from the central processing unit 3; the VPN (11–10) are compared by a comparator 152 with the vpn (11–10) of the logical addresses outputted from the central processing unit 3; and the ASID read out is compared by a comparator 153 with the present space identifier asid latched by the PTEH register 51. For the comparison results, a control logic 154 decides the miss/hit of the bank 11 by considering the values of the share status SH, the size bit SZ, the single virtual bit SV and the mode bit MD. The hit signal hit1 is the decision result of the miss/hit in the bank 11. The aforementioned comparators 151 to 153 and control logic 154 are provided for each of the banks 11 to 14. In FIG. 7, the hit signals hit2 to hit4 are representatively shown for the individual banks 12 to 14. According to the present embodiment, the outputs of the individual comparators 151 to 153 are given the matched high level. The high levels of the hit signals hit1 to hit4 are used as the hit level. The control circuit 50 decides the TLB hit if any of the hit signals hit1 to hit4 is set to the hit level. Reference numeral 501 appearing in FIG. 7 designates a TLB hit signal for informing the CPU 3 of the decision result of the TLB hit/miss. When the TLB miss occurs, the entry of the translation lookaside buffer 1 is replaced. In this replacement, the content of the entry to be replaced is latched in the PTEH register 51 and the PTEL register 52 so that the information to be replaced is fed from the PTEH register 51 and the PTEL register 52 is fed to and fetched in the TLB 1. The index method for selecting the entry to be replaced is identical to that at the aforementioned reading time, but which bank (or set) that entry is to be latched is decided by the value (MMUCR.RC) of the RC of the MMUCR register 55.

Figure 21:
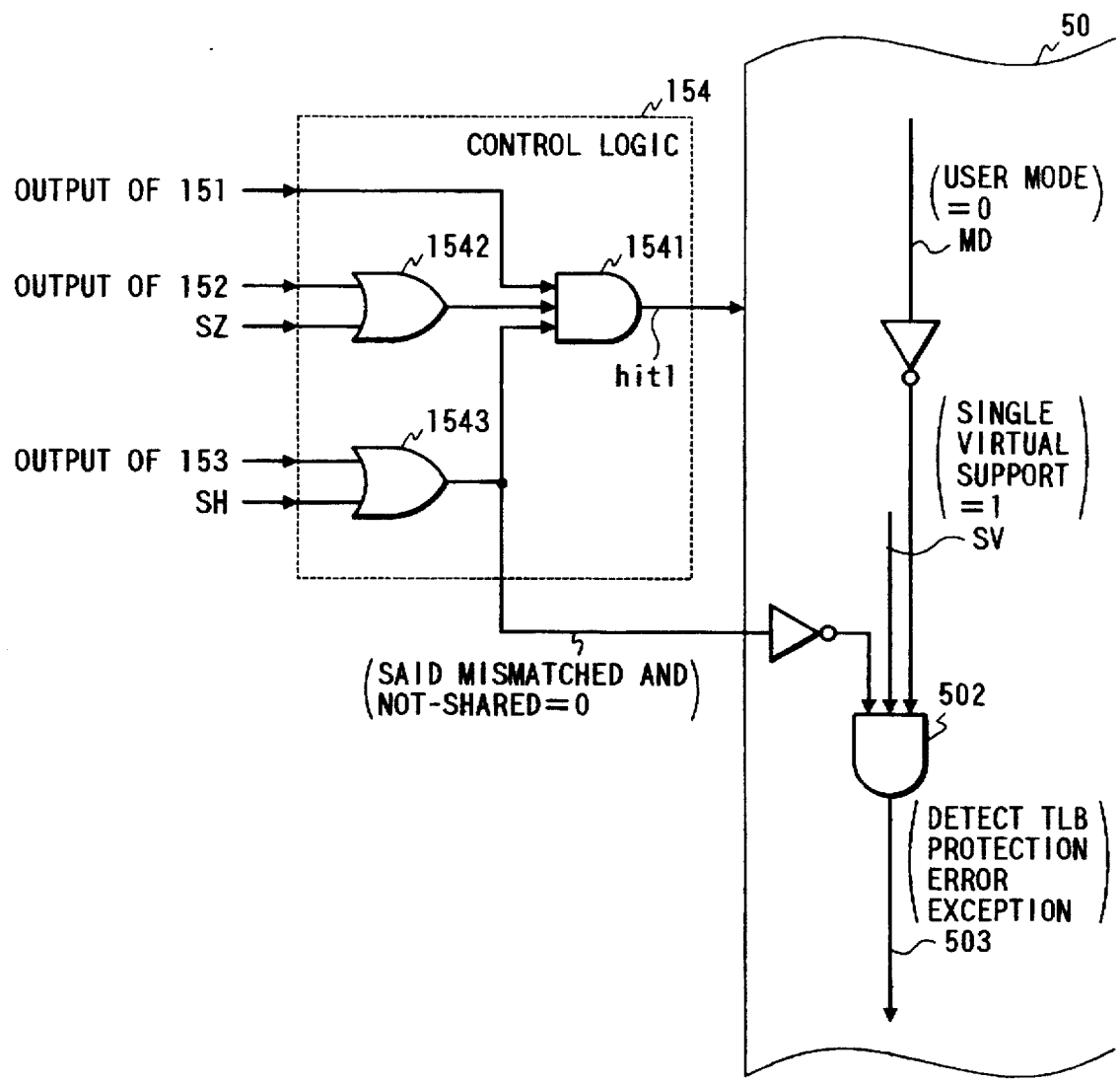
FIG. 21 is a logical circuit diagram showing one example of the control logic for controlling the address comparison result to be reflected upon a hit signal in each bank of the TLB.

FIG. 21 shows one example of the logical construction of the aforementioned control logic 154. Numeral 1541 designates a three-input AND gate; numeral 1542 a two-input OR gate; and numeral 1543 a two-input OR gate. The OR gate 1542 inputs both the output of the comparator 152 or the result of the comparison between the VPN (11–10) contained in the indexed TLB entry (i.e., the entry selected and read out by the index address) and the vpn (11–10) contained in the logical address and the size bit SZ coming from the aforementioned indexed TLB entry. In case the size bit SZ is set to 1 so that the virtual page size of 4 KB is indicated, there is no need for comparing the VPN (11–10) in the TLB entry and the vpn (11–10) from the CPU 3, in the address comparison for deciding the TLB miss/hit. In the status of the size bit SZ=1, therefore, the comparison result of the aforementioned address bits 11 and 10 is not reflected upon the output signal hit1 of the AND gate 1541. In case the size bit SZ is set to 0 to indicate the virtual page size of 1 KB, the comparison between the address bits 11 and 10 is required for the decision of the TLB miss/hit, and the comparison result is reflected upon the signal hit1.

The aforementioned OR gate 1543 inputs both the output of the comparator 153 or the result of comparison between the address space identifier ASID contained in the indexed TLB entry and the present address space identifier (or the address space identifier outputted from the PTEH register 51) asid and the shared bit SH coming from the aforementioned indexed TLB entry. In case this shared bit SH is at 1, the status of "sharing the virtual page among the processes" is indicated. In this status, therefore, the comparison between the address space identifiers is not required in the address comparison for the decision of the TLB miss/hit. In the status of the shared bit SH=1, therefore, the comparison result between the address space identifiers is not reflected upon the output signal hit1 of the AND gate 1541. In case the shared bit SH in the aforementioned index is set to 0 to instruct the "non-share status of the virtual page among the processes", the comparison between the address space identifiers is required in the address comparison for the decision of the TLB miss/hit. In the status of the shared bit SH=0, therefore, the comparison result between the address space identifiers is reflected upon the output signal hit1 of the AND gate 1541.

In the single virtual support, the aforementioned address space identifier ASID owned by the TLB entry is used as the memory protecting information (or domain number). In not only the single virtual support but also the multiple virtual support, the share or non-share status is indicated by the shared bit SH. When the non-share is indicated, the mismatch between the present address space identifier asid and the address space identifier ASID contained in the TLB entry is decided as the TLB miss in the multiple virtual support. When the non-share is indicated, on the contrary, the mismatch between the address space identifiers asid and ASID is used in the single virtual support for detecting the TLB protection error exception. In order to realize this, the control circuit 50 is equipped with an AND gate 502, as shown in FIG. 21, as one logic for checking the access right. In response to the inverted output of the aforementioned OR gate 1543, the signal virtual bit SV from the MMUCR register and the inverted signal of the mode bit MD in the status register in the central processing unit 3, the AND gate 502 generates a TLB protection error exception detection signal 503. This detection signal 503 has its high level at the detection level of the TLB protection error exception. This TLB protection error exception is detected by the signal 503 only when the address space identifiers mismatch and are not shared (that is, when the output of the OR gate 1543 is at the low level) and when the conditions for the single virtual support (SV=1) and the user mode (MD=0). Specifically, if the address space identifiers mismatch and are not shared in the single virtual support, the TLB miss is substantially decided. This status is set to the TLB protection error exception for the memory protection. In the privileges status indicated by the mode bit MD=1, it is desired that the virtual page assigned to another process can also be accessed. In the privileged status of MD=1, therefore, the TLB protection error exception is not detected.

Figure 10:
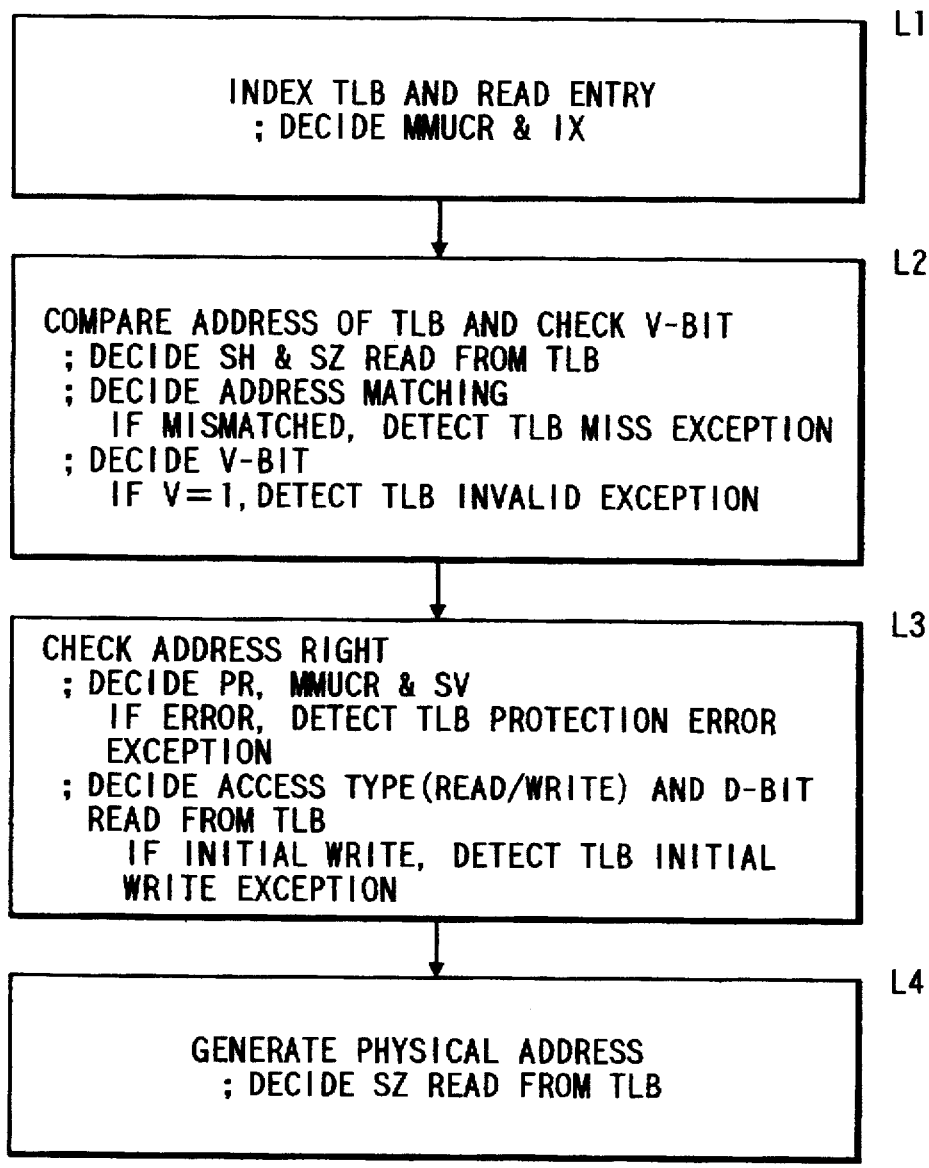
FIG. 10 is a control main flow chart of an address translation.

FIG. 10 is a main flow chart showing the control of an address translation by the control circuit 50. This control is coarsely divided into a step L1 of indexing the translation lookaside buffer 1, a step L2 of comparing the addresses and checking the V-bit, a step L3 of checking the access right, and a step L4 of generating the physical address. These steps are controlled by the CPU 3 and the controller 5.

Figure 11:
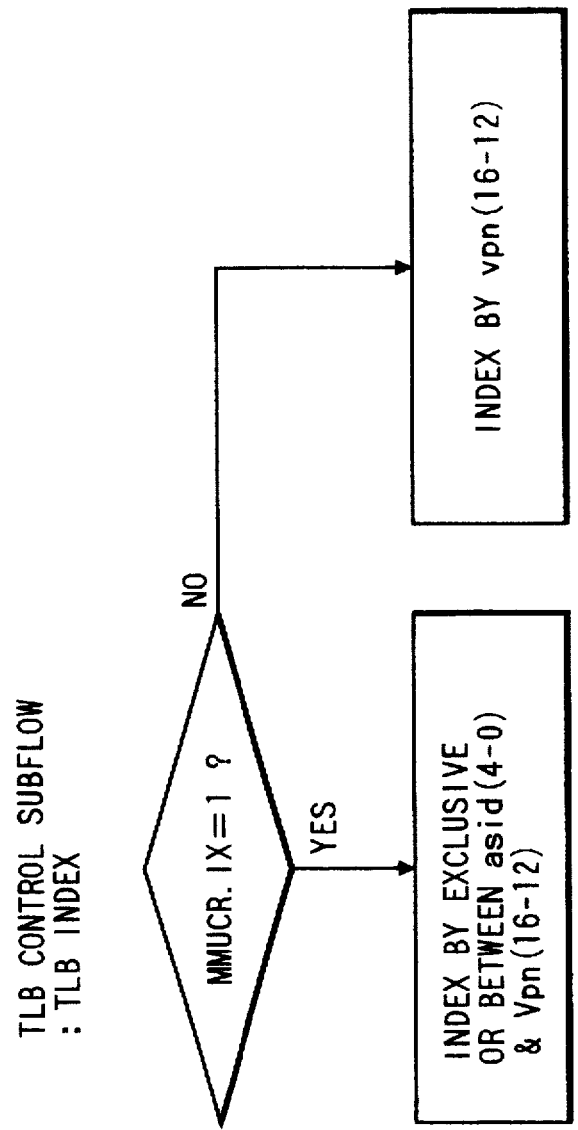
FIG. 11 is a control flow chart for selecting an index method of the TLB.

At the step L1 of indexing the translation lookaside buffer 1, the logical address to be used in this step is set to vpn (16–12) irrespective of its size. At this index step, it is decided by the value (MMUCR.IX) of the IX of the MMUCR register 55 whether or not the logical address hashed by the portion asid (4–0) of the space identifier asid is to be used as the indexing address by the exclusive OR gate XOR. In case the MMUCR.IX is at 1, as shown in FIG. 11, the aforementioned used logical address is hashed to the indexing address by the asid (4–0). In case the MMUCR.IX is at 0, on the other hand, the vpn (16–12) is used as it is as the indexing address. The former index method is shown in FIG. 3 whereas the latter index method is shown in FIG. 2. When the TLB 1 is indexed, one of the thirty two entries is selected and read out from each of the banks 11 to 14. Each entry to be selected contains the VPN (31–12), the VPN (11–10), the ASID, the SH, the SZ, the V, the PPN (31–10), the PR, the C and the D as its information.

Figure 12:
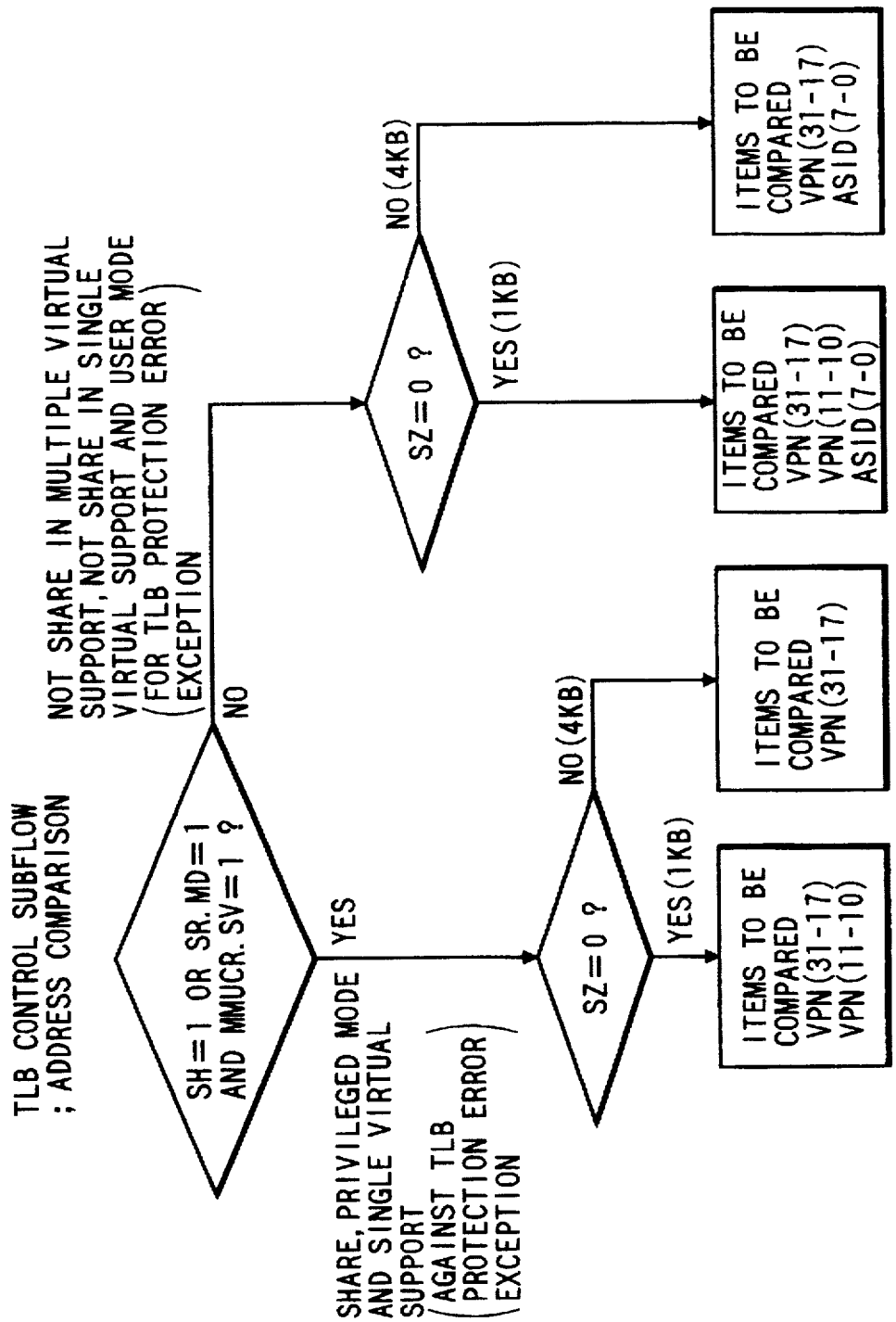
FIG. 12 is a control flow chart for comparing the logical address and the address of a tag indexed by the former.

In FIG. 12, there is shown on example of the procedure of the address comparison to be executed at the step L2 of comparing the addresses and checking the V-bit. The procedure, as shown herein, is based upon the logic of the control logic 154 shown in FIG. 21, but the detection of the TLB protection error exception is also considered as to the comparison of the space identifier ASID. How to determine the object of the address comparison to be reflected upon the hit signals hit1 to hit4 is decided, as follows. First of all, whether or not the space identifier is considered as the object of the address comparison is coarsely decided depending upon whether or not the SH is at 1. Whether or not the VPN (11–10) is considered as the object of the address comparison is decided depending upon whether or not the SZ is at 0. Especially in the single virtual support (SV=1), the infield data of the space identifier ASID are used as the memory protection information. In the single virtual support and in the privileged mode (SV=1 and MD=1), however, the field of the space identifier ASID is excluded from the comparison object so that the virtual page assigned in the privileged mode to another process may also be accessed from the present process, that is, so that the TLB protection error exception may not be detected.

By this index, the TLB entry is read from the TLB 1. On the basis of the share status SH in the read TLB entry, it is decided whether or not the space identifier ASID is to be considered at the time of the address comparison. The space identifier ASID is not considered as the object of the address comparison in the case of SH=1 (share) but is considered as the object of the address comparison in the case of the SH=0 (non-share). Moreover, in case the value (MMUCR.SV) of the SV of the MMUCR register 55 is set to 1 so that the single virtual support is set and in case the mode bit SR.MD of the status register SR is at 1 (that is, the central processing unit is operating in the privileged mode), the space identifier ASID is not considered in the detection of the TLB protection error exception. This is intended from the characteristics of the privileged mode to make it possible to access the virtual page assigned to another process from the present process.

In the present embodiment, the size of 1 KB or 4 KB is selected as the size of the virtual page in accordance with the value of the size bit SZ in the TLB entry. In case the size of the virtual page is at 1 KB, the informations VPN (31–17) and VPN (11–10) in the TLB entry, as indexed in each bank, are made the objects of comparison with the corresponding bits vpn (31–17) and vpn (11–10) of the logical address. In case the virtual page size is at 4 KB, the VPN (11–10) in the TLB entry, as indexed in each bank, and the corresponding vpn (11–10) in the virtual page are excluded from the object of the comparison decision.

As described above, the comparison objects (VPN (31–17, 11–10), vpn (31–17, 11–10), ASID and asid) are determined and compared. If a matching occurs in any bank as a result of the comparisons, a hit signal is outputted from the matching bank. The hits of the individual banks are outputted as the hit signals hit1 to hit4 so that the TLB hit is decided. If no hit signal is outputted from all the banks, that is, in the mismatching case, on the contrary, the TLB miss exception is detected. This result is informed by the signal 501 to the CPU 3, which processes the TLB miss exception, as will be described hereinafter.

For the entry of each indexed bank, moreover, the V-bit in the entry is checked. In other words, the V-bit in the read entry is checked. In the case of the TLB hit, if the V-bit in the hit entry is 0 (invalid), the TLB invalid exception is detected and informed to the CPU 3. The content of this exception processing will be described hereinafter. The decision result of the V-bit in the case of the TLB miss is used in the later-described entry replacement relating to the TLB miss.

Figure 13:
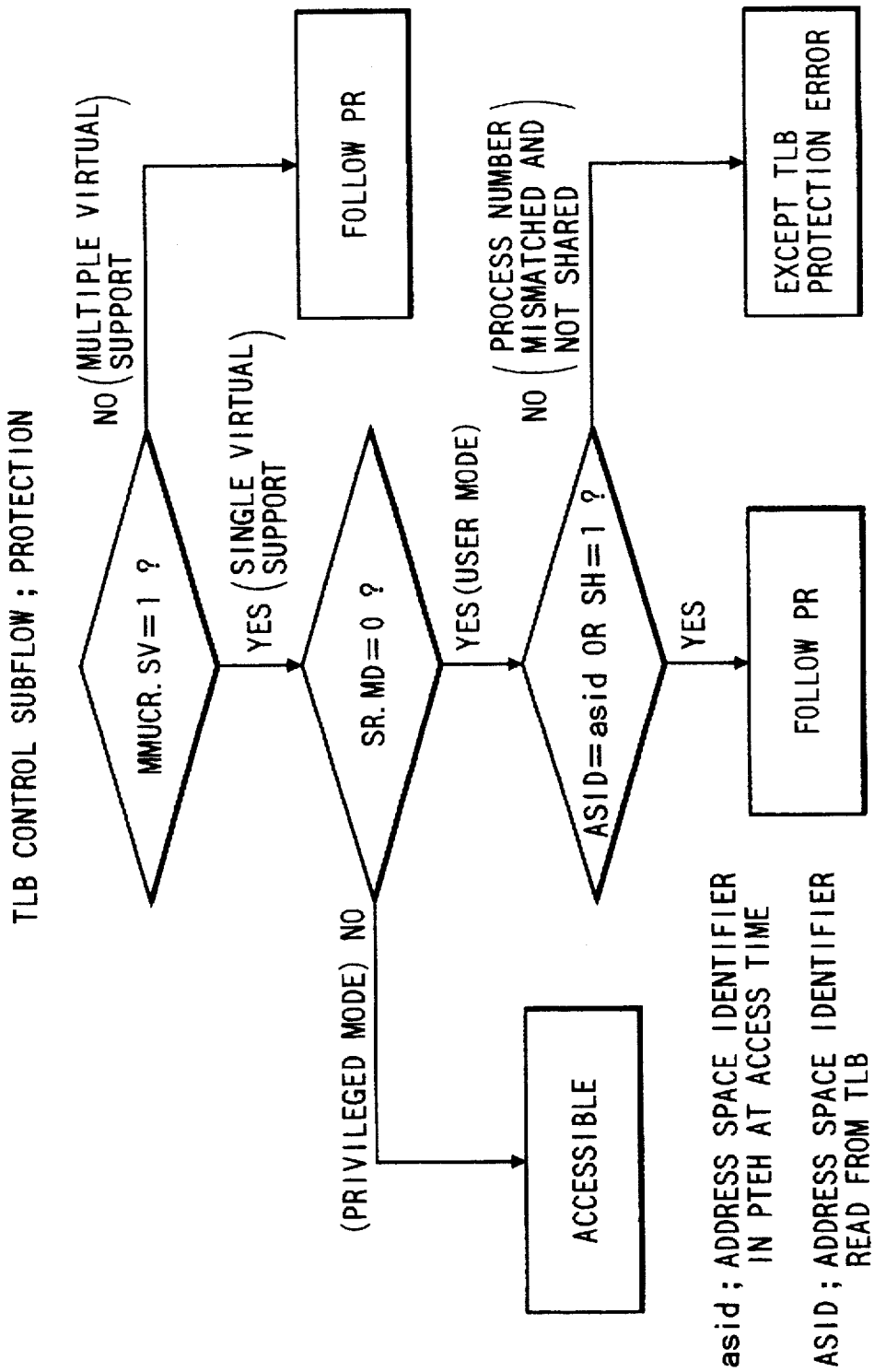
FIG. 13 is a flow chart of a portion of the protection control containing the control for using an ASID for the memory protection in a single virtual support.

At the step L3 of checking the access right, the access right is checked according to the content of the information PR in the TLB entry read by the index and the content of the bit MMUCR.SV in the MMUCR register. As shown in FIG. 13, for example, it is decided at first whether the bit MMUCR.SV in the MMUCR register is at 1 (single virtual support) or 0 (multiple virtual support). In the case of the multiple virtual support (SV=0), the address space expressed by the information in the TLB entry is protected according to the content of the PR, as shown in FIG. 9. In the case of the single virtual support and the privileged mode, that is, in the case of MMUCR.SV=1 (single virtual support) and in case the bit SR.MD=1 (privileged mode) in the status register, the address space, as expressed by the information in the TLB entry, can be unconditionally accessed. In the case of the user mode (SR.MD=0: user mode) despite the single virtual support, on the contrary, the space identifier ASID and the share status SH are considered at the time of checking the access right. Specifically, either in case a matching is satisfied between the space identifier asid of the PTEH register 51 at the access time and the space identifier ASID read from the TLB 1 or in the case of SH=1 (share), the address space, as expressed by the information in the TLB entry, is protected according to the aforementioned PR. In case the address space identifiers are mismatched and non-shared, on the contrary, the TLB protection error exception is detected. The content of this exception will be described hereinafter. At the access right checking step L3, moreover, the access type is decided on whether the access is for the reading or writing operation, and the D-bit of the entry read from the TLB 1 is decided. In case the access is at the first write (i.e., the first write access after the power ON or the reset), the TLB initial page write exception is detected. Specifically, the TLB initial page write exception is detected under the conditions that the result of comparison between the logical address and the indexed TLB entry is the TLB hit, that the dirty bit D in the TLB entry is at 0 and that the access at this time is a write access. The content of this TLB initial page write exception processing will be described hereinafter.

Figure 14:
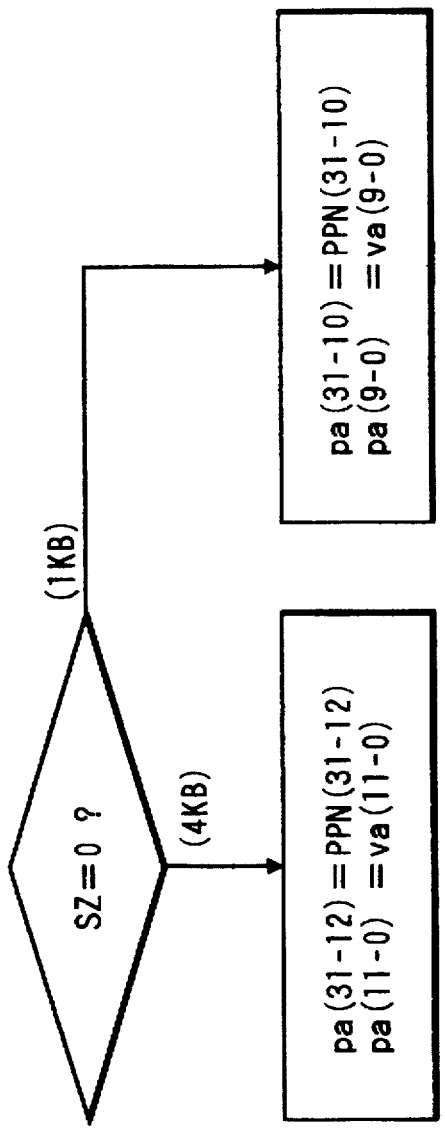
FIG. 14 is a flow chart showing a procedure of generating a physical address according to a page size.

At the step L4 of generating the physical address, the physical address is generated, as shown in FIG. 14, in accordance with the size bit SZ of the indexed TLB entry. The offset va (9–0) of a logical address va to be used for generating a physical address pa is latched in the latch circuit in the control circuit CTRL 50, although not shown. If SA=0 (the virtual page size is at 1 KB), the va (9–0) of the logical address va outputted from the CPU 3 is used as the offset pa (9–0) of the physical address pa. Specifically, all the bits PPN (31–10) of the physical page number PPN, as contained in the data part of the hit TLB entry, is used the physical page address pa (31–10). The address (9–0) is added as the offset to the less significant side to generate the physical address pa. If SZ=1 (the virtual page size is at 4 KB), the offset va (11–0) of the logical address va outputted from the CPU 3 is used as the offset pa (11–0) of the physical address pa. Of the physical page number PPN contained in the data part in the hit TLB entry, the PPN (31–12) having its less significant 2 bits ignored is used as the physical page address pa (31–12). The address (11–0) is added as the offset to the less significant side to generate the physical address pa.

Figure 15:
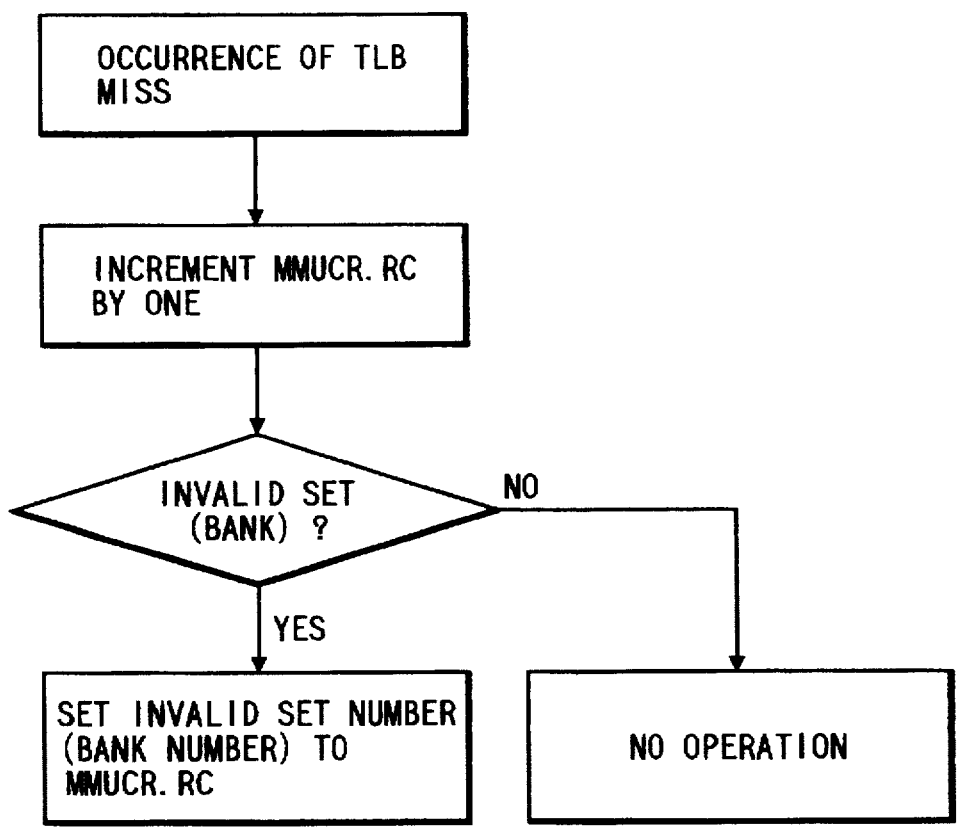
FIG. 15 is a control flow chart for designating a bank to be replaced, by a hardware.

FIG. 15 shows a hardware designation method of a bank to be replaced in the TLB miss exception, as detected at the step L2 of checking the address comparison and the V-bit. This control is uniquely executed by the control circuit 50 in accordance with its logical construction and uses the bit MMUCR.RC of the MMUCR register as counter means such as a random counter. Here, the power of 2 of the bit number of the MMUCR.RC is equalized to the number (=4) of the banks of the aforementioned TLB 1. In response to the fact that none of the aforementioned hit signals hit1 to hit4 indicates the hit status, the control circuit 50 decides the necessity for the replacement of the entry for the TLB 1. After this decision, the control circuit 50 increments the MMUCR.RC by one (+1) to examine whether or not an invalid entry is in the four entries indexed. This is achieved by examining the V-bit in each of the four indexed entries. In case this examination of the V-bit reveals no invalid entry (all the entries of each indexed bank latch the valid data "V=1"), the incremented result is used as the bank number to be replaced and sets the MMUCR.RC to no operation. In case an invalid entry is present (any of the entries indexed in each bank exhibits V=0 and has no valid data latched), the bank number of the bank having the invalid entry is set in the MMUCR.RC, and the bank having the set number is used as the bank to be replaced. Moreover, each bit of the aforementioned MMUCR.RC can have its value arbitrarily changed if the software is executed by the CPU 3. As a result, the bank number set in this register, as described above, can be further changed by the software. As a result, any bank can be made the object of replacement.

Figure 16:
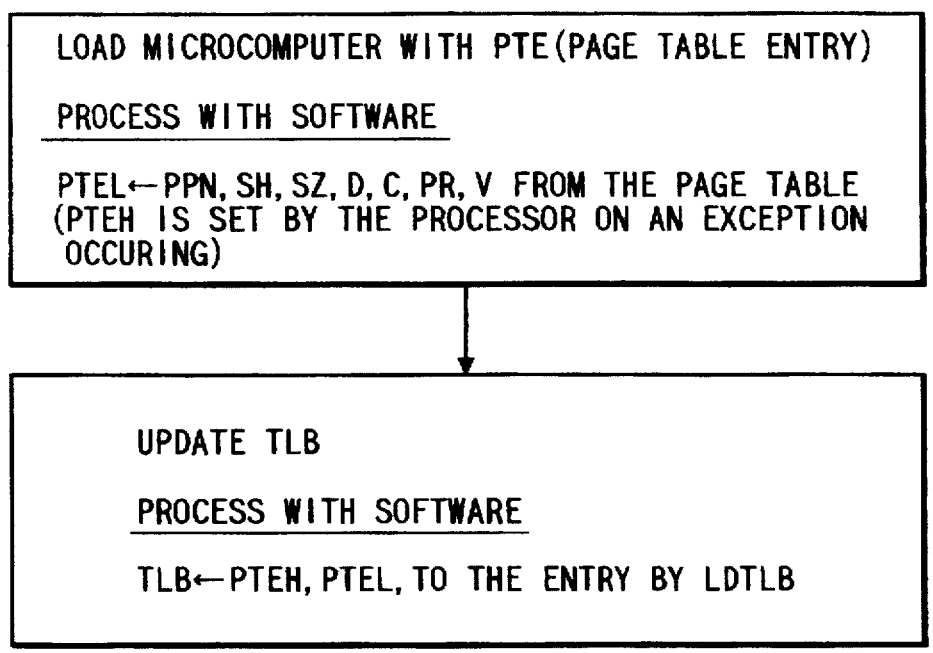
FIG. 16 is a flow chart showing one example of the processing of a TLB miss handler for updating the TLB entry to be started by an exception caused by the TLB miss.

FIG. 16 shows a processing procedure by the TLB miss handler for updating the TLB entry so as to cope with the aforementioned TLB miss exception. A load TLB instruction is used for updating the entry of the TLB 1. This load TLB instruction (as will also be expressed by the "LDTLB") is executed for the following processing by the CPU 3. Specifically, the values of the individual PTEH and PTEL registers 51 and 52 are written in the entries of the TLB 1. In this case, the entries to be written are those in the banks, which are indicated by the bank numbers set in the MMUCR.RC, although not especially limitative thereto, and are entries for indicating the logical addresses (i.e., bits 12 to 16) latched in the PTEH register 51, as the index addresses. If the aforementioned TLB miss exception is detected, the portion (i.e., the bits 10 to 31) of the logical addresses at that time, as outputted from the CPU 3, are latched in the aforementioned PTEH register 51. As a result, the entry at the replacement time is indicated by the index address of the same number as that of the index address at the time which the TLB miss exception occurs. However, the bank to be used for the replacement is decided by the bank number which is set in the MMUCR.RC.

Figure 22:
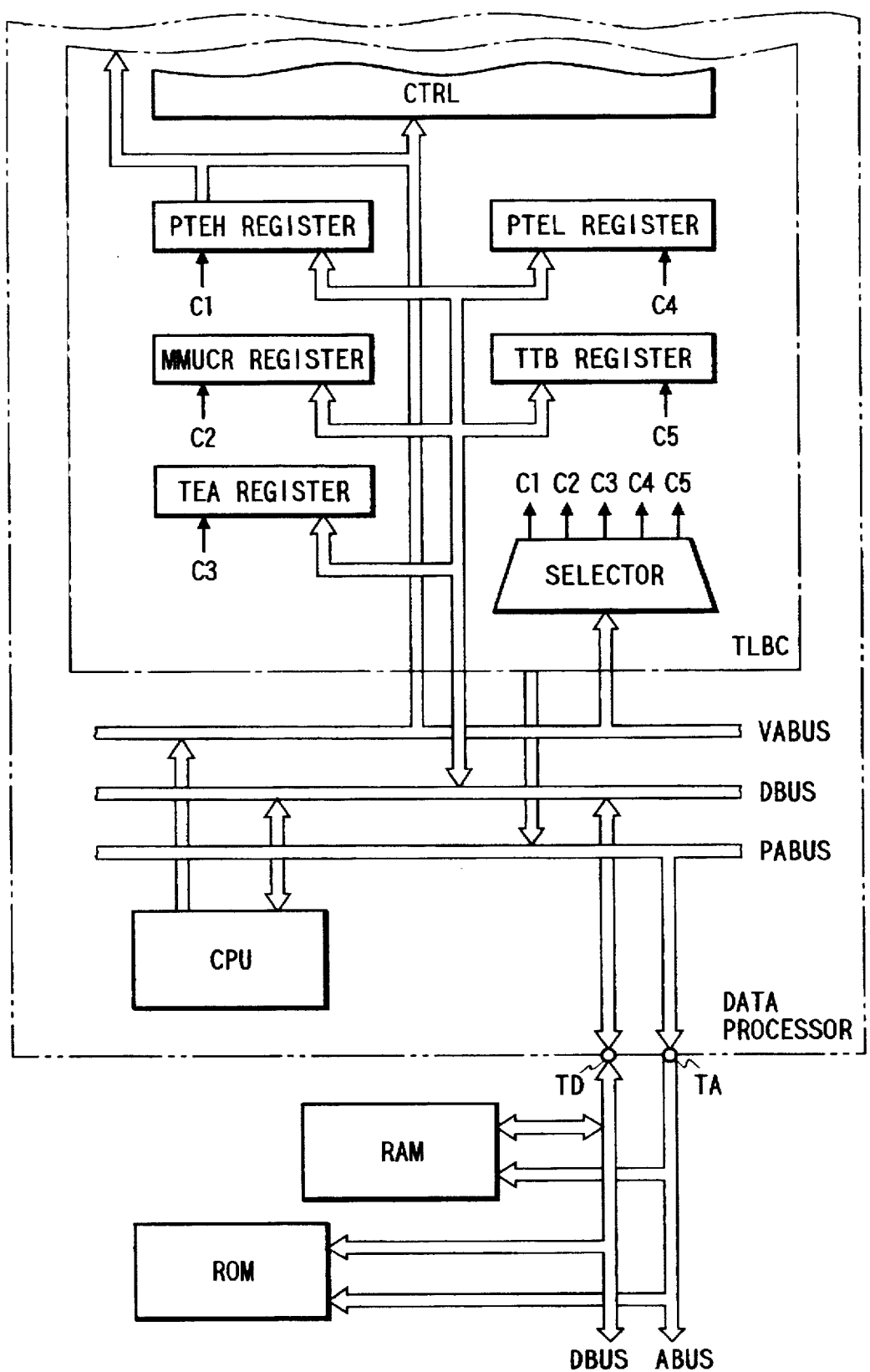
FIG. 22 is a block diagram showing a portion of FIG. 7 in more detail.

In order to cope with the TLB miss exception, a page table is prepared in advance by the user in the external memory RAM, as shown in FIG. 22. In this page table, a plurality of translation informations (e.g., page table entries) corresponding to the individual logical addresses are latched according to predetermined rules, although not especially limitative thereto. The addresses of this page table such as a start address is latched in advance as the base address in the register TTB 53. In this page table, a plurality of page table entries individually corresponding to the logical addresses are arranged according to such rules as can retrieve the page table entries (containing the corresponding physical page number ppn, valid bit v, protection bit pr size bit sz, cacheable bit c, dirty bit d and status sh) corresponding to those logical addresses on the basis of the aforementioned base addresses and logical addresses as the start address, although not especially limitative thereto.

The aforementioned TLB miss handler is described by the user. This TLB miss handler is started by the TLB miss handler when the TLB miss exception is detected. As a result, the information vpn (10-31) of the logical address upon the occurrence of the TLB miss is latched in the PTEH register 51. At this time, the space identifier asid at the occurrence of the TLB miss may also be latched in the PTEH register 51. On the other hand, the CPU 3 retrieves the aforementioned base table on the external memory by using the base address latched in the register TTB 53 and the logical address at the occurrence of the TLB miss. The page table entry corresponding to the logical address at the occurrence of the TLB miss has its content loaded, if discovered by that retrieval, in the PTEL register 52. Next, the load TLB instruction is issued so that the entries of the TLB 1 are updated by the values of the individual registers PTEH and PTEL 51 and 52. As a result, the informations vpn and asid of the logical addresses at the occurrence of the TLB miss, as latched in the PTEH register 51, are adopted as the partial VPN and ASID of the TLB entries. Moreover, the entries to be replaced at this time are those in the bank which is indicated by the bank number set in the MMUCR.RC, as described above, and are indicated by the same index address as that at the occurrence of the TLB miss.

The aforementioned TLB invalid exception occurs in the case of the page fault in the TLB hit. For this exception, for example, the page table entry on the external memory is recovered to set the V-bit in the page table entry to the logical value 1. After this, the PTEL register 52 is located with that page table entry from the external memory, and the aforementioned load TLB instruction is issued to up data the corresponding entry of the TLB 1 by the values of the individual PTEH and PTEL registers 51 and 52.

When the aforementioned TLB initial page write exception is detected, the D-bit of the corresponding page table entry on the external memory is set to the logical value 1 to load the PTEL register 52 with that page table entry from the external memory. After this, the aforementioned load TLB instruction is issued to update the corresponding entry of the TLB 1 by the values of the individual PTEH and PTEL registers 51 and 52. Incidentally, the informations vpn and asid of the logical addresses for causing the exception are latched in the PTEH register 51. The situation for the D=1 is established at the first write of the physical page field on the main memory. In the virtual support, in order to match the data between the auxiliary memory and the main memory (e.g., the external memory of FIG. 22) at the page replacement, it is necessary to decide whether or not the content of the page of the main memory to be replaced is to be copied back to the auxiliary memory. The dirty bit D is used for this decision.

When the aforementioned TLB protection error exception is detected, the virtual page number vpn of the logical address for causing the exception is written to the PTEH register 51, and the logical address is written to the TEA register 54. After this, the handler for solving that protection error is started.

In case the MMUCR.RC is used as the counter, as described above, the increment is desired for registering a new bank entry at the time when the aforementioned TLB miss exception is to be coped with. For coping with the aforementioned invalid exception, TLB initial page write exception and TLB protection error exception, on the contrary, it is desired not to increment the MMUCR.RC. This is because, in these counter-measures, only the D-bit or V-bit is necessary to change so that the TLB can be used more effectively by no registration in a new bank than by a registration in the original bank, although the present invention should not be limited thereto.

Figure 17:
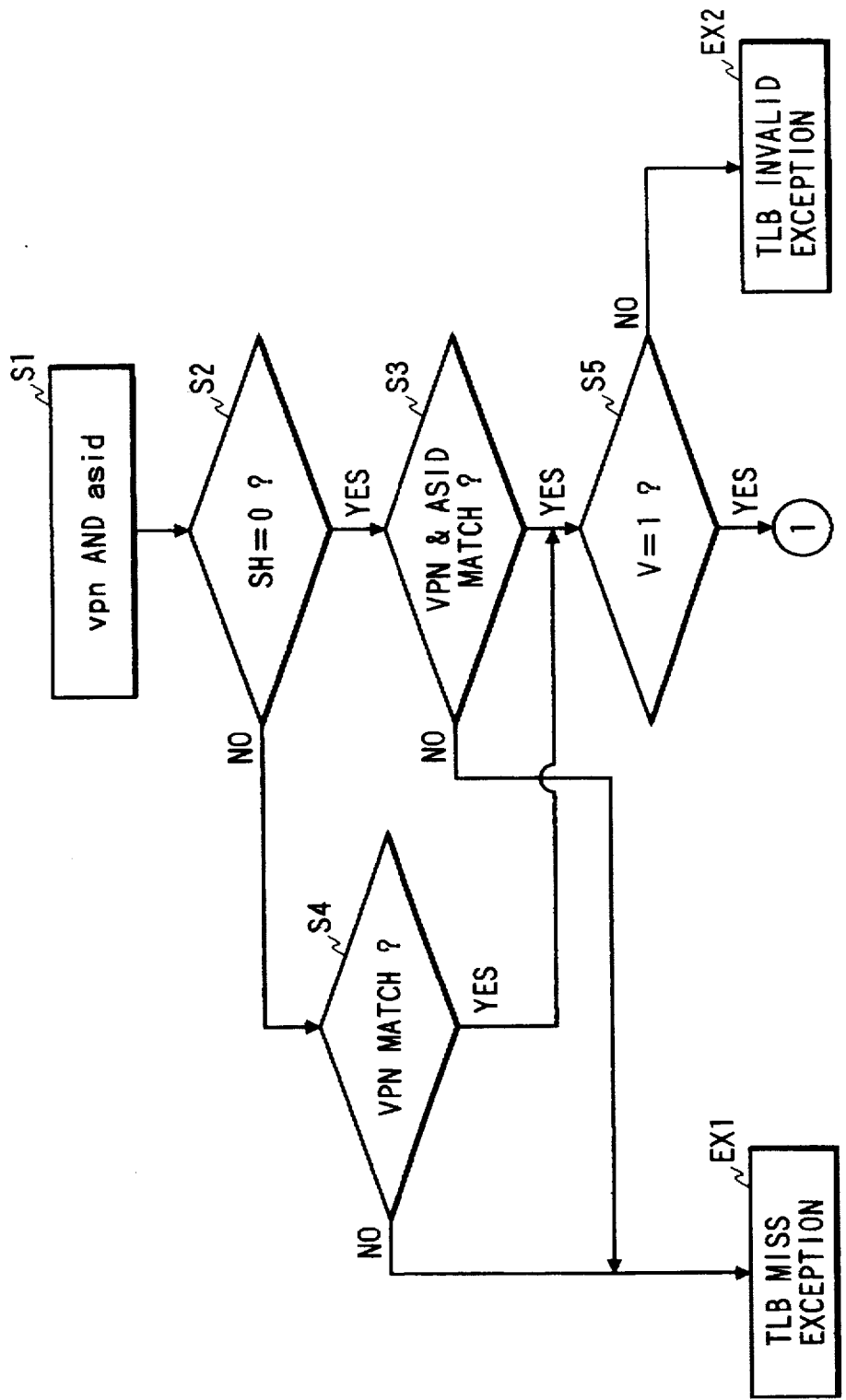
FIG. 17 is a flow chart showing a first half of the exception detecting process relating to the TLB in the single virtual support.
Figure 18:
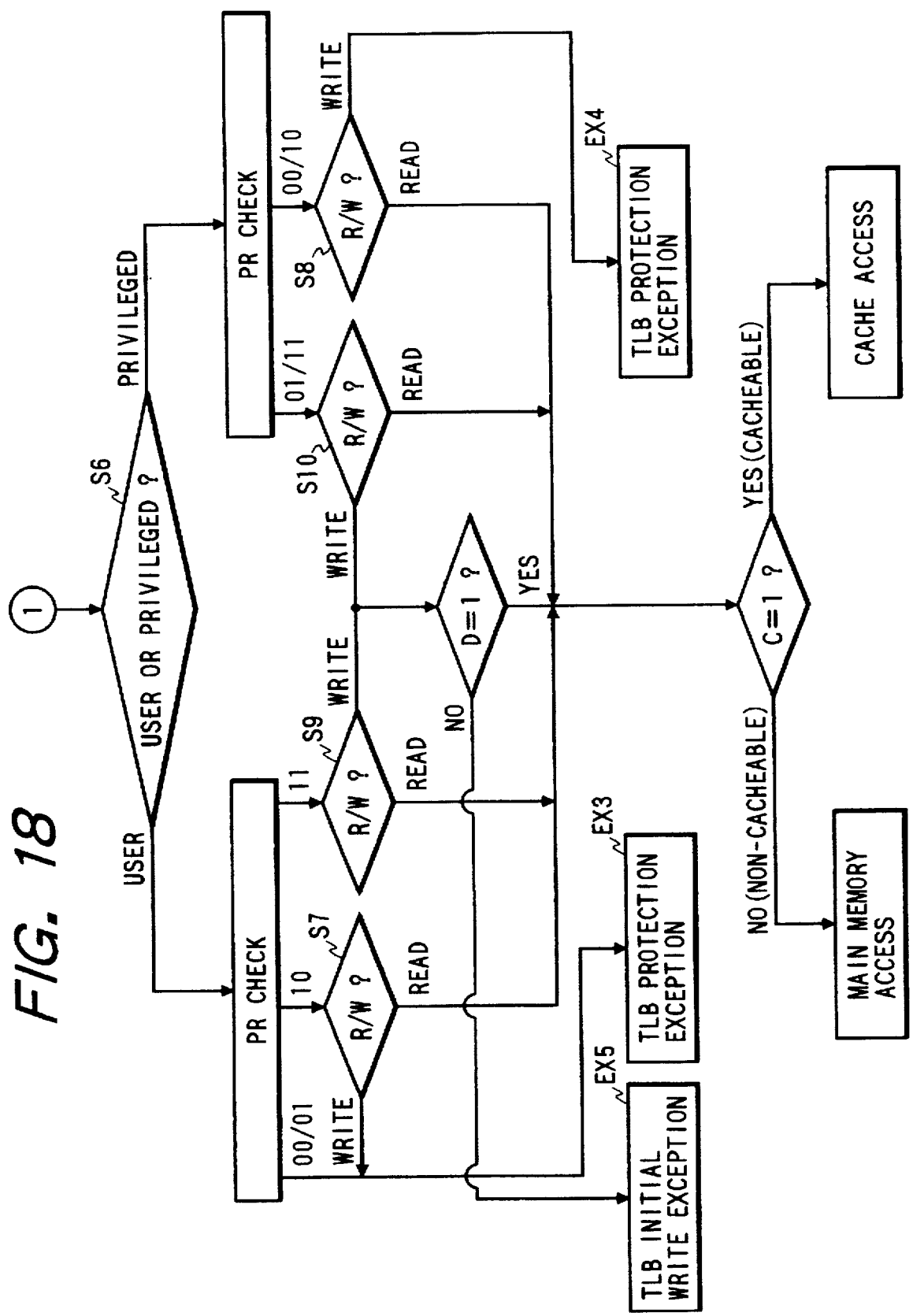
FIG. 18 is a flow chart showing a second half of the exception detecting process relating to the TLB in the single virtual support.

FIGS. 17 and 18 show the entirety of the exception detecting flow of the TLB 1 in case the multiple virtual support is indicated by setting the bit MMUCR.SV of the MMUCR register to 0. According to FIG. 17, the TLB 1 is indexed (at S1) by a predetermined method according to the vpn of the logical address and the present space identifier asid. In case the indexed entry resultantly contains SH=0 (non-share), the TLB miss exception (EX1) is detected if the ASID or VPN mismatches (at S3). In case the indexed entry contains SH=1 (share), the ASID is not compared, and the TLB miss exception (EX1) is detected if the VPN mismatches (at S4). In the case of the TLB hit (in case the answers of S3 and S4 are YES), it is decided (at S5) whether or not V=1. In the case of V=0 (invalid), the TLB invalid exception (EX2) is detected. In the case of V=1 (valid), it is decided (at S6) from the bit SR.MD of the status register, as shown in FIG. 18, whether the mode is the user mode (User) or the privileged mode (Privileged). In case (PR=00 or 01) the CPU 3 is operating in the user mode so that the entry read by the access by the CPU 3 operating in that mode has the information PR indicating the allowance of the access in the privileged mode (or the inhibition of the access in the user mode), the TLB protection error exception (EX3) is detected. In case, on the other hand, the information PR in the read entry is decided to be at 10 by the access in the user mode, it is further decided whether the access belongs to the read access or the write access type. If the information is at 10, as shown in FIG. 9, the user access is allowed to have only the read access type. In case, therefore, the aforementioned access belongs to the write access type, the access type is different (i.e., the write of S7), the TLB protection error exception (EX3) is detected.

In the case of PR=00 or 10 even in the access in the privileged mode, the TLB protection error exception (EX4) is detected if the read/write access type is contrary to the content of the PR (i.e., the write of S8). Specifically, the access right to be allowed by the PR is different depending upon whether the CPU 3 is operating in the user mode or the in the privileged mode. In either event, in case the access is made in an access type other than that allowed by the PR, the TLB protection error exceptions (EX3 and EX4) are detected. In case the access type belongs to the right (i.e., the write of S9 and S10) allowed by the PR, the TLB initial write exception (EX5) is detected if the information D in the entry is at 0 (or unwritten page). In case the information D in the entry is at 1, on the other hand, the cache memory 4 is accessed if the information C in the entry is at 1, and the main memory (e.g., the external memory RAM or ROM of FIG. 2) is accessed if C=0. In case the access type is the read (i.e., the read of S7 to S10) allowed by the PR, the cache memory 4 is accessed if C=1, and the main memory is accessed if C=0.

FIG. 22 mainly shows the connection relations between the individual registers and the central processing unit CPU, as shown in FIG. 7. The logical addresses generated by the central processing unit CPU are fed through the internal logical address bus VABUS to the selector in the TLB control circuit TLBC. This selector decodes the logical addresses and generates a selection signal for selecting the registers in case these logical addresses are intrinsic ones assigned to the registers. In case the logical addresses are those assigned to the PTEL register, for example, the selector generates the selection signal C4 to select that register. Likewise, the remaining registers (PTEH, MMUCR, TEA and TTB) are selected. In other words, these registers are address-mapped. The read/write of the selected register by the central processing unit are instructed through the not-shown internal control bus by the read/write control signals fed from the central processing unit to the individual registers. It is quite natural that the individual registers and the central processing unit CPU are connected to each other through the internal data bus DBUS, as shown. The individual registers are connected with both the control circuit 51 and the TLB 1, as shown in FIG. 7, but are not so shown in FIG. 22 so as to avoid the complicated illustration. The central processing unit is enabled to write the data in the registers by executing the software. Specifically, the central processing unit is enabled to write the data in the registers by executing the software to output the logical addresses assigned to the registers to the bus VABUS, to output the data to the bus DBUS and instruct the write by the read/write signals. BY executing the software, the central processing unit can also read out the data from the registers. By thus executing the software, it is possible to write the logical space identifiers and the logical addresses at the TLB miss time in the PTEH register, to write the table entry at the replacing time in the PTEL register, to write the base address in the TTB register, and to write the logical addresses in the TEA register at the time of the protection error exception. Moreover, the various control data shown in FIG. 6 can be written in the MMUCR register so that the specific bits can be used as the counter.

The internal logical address bus VABUS is also connected with the control circuit CTRL and the TLB 1. The control circuit CTRL is equipped with a latch circuit for latching the offset of the logical address, as described above, so that the offset of the logical address from the internal logical address bus VABUS is latched. Moreover, the logical address from the CPU 3 is fed to the TLB 1 through that internal logical address bus VABUS so that it is used as the index address and the retrieving address. It is quite natural that the aforementioned latch circuit disposed in the control circuit CTRL may latch not only the offset address but all the logical addresses.

This drawing explicitly illustrates only the connection between the aforementioned PTEH register and TLB 1. The space identifier for deciding the miss/hit of the TLB 1 is set in this register and fed therefrom to the aforementioned TLB 1. In the counter-measures for the miss exception of the TLB 1, too, the logical addresses are fed from that register to the TLB 1.

The internal data bus DBUS and the internal physical address bus PABUS are connected with the external data bus DBUS and the external address bus ABUS through the external terminals TD and TA provided in this data processor. With these external buses, there are connected the external memories RAM and ROM, as shown. Of these, the external memory RAM is a volatile memory which is formed with the afore-mentioned various tables, although not especially limitative thereto. On the other hand, the external memory ROM is a non-volatile memory which latches the various programs (e.g., the software for the aforementioned handler).

The effects and features of the virtual memories in the microcomputer of the present embodiment will be individually described in the following.

<<Support of Plural Page Sizes>>

As shown in FIGS. 5 and 6, the page table entry and the TLB entry have the aforementioned size bit SZ so that the sizes of the virtual page can be set for each page. The 4-way set associative type translation lookaside buffer 1 is shared among the plural virtual pages capable of having their sizes set variable. In the present embodiment, two kinds of virtual page sizes of 1 KB and 4 KB are supported by the microcomputer. Moreover, the method of designating the indexing addresses for the TLB 1 are made common between 4 KB and 1 KB. In the present embodiment, as shown in FIGS. 2 and 3, of all the logical addresses 32 bits to be generated in the central processing unit, the bits 12 to 16, i.e., the vpn (16–12) are used for indexing the TLB 1. Since the index addresses are of 5 bits, the maximum thirty two entries can be retained for one bank (or way). Since the TLB 1 has the four banks 11 to 14, the maximum four entries can be retained for one index address. In case the page size has 4 KB, the index addresses are made to fall at the five bits vpn (16–12) from the least significant one of the virtual page number vpn. For the page size of 4 KB, the entries of an arbitrary virtual page numbers can be retained at the thirty two entries for each bank (i.e., one hundred and twenty eight entries for all the banks). In the case of the page size of 1 KB, on the other hand, the vpn (11–10) of 2 bits from the least significant bit of the virtual page number vpn is not used for the indexing. If, therefore, the index of the case of one bank is considered for the virtual page size of 1 KB, the indexed entry indicates any of the four virtual page numbers (each having a page size of 1 KB), as selected by the index addresses of 5 bits. The 2 bits (i.e., bits 10 and 11), as not used for the indexing, are used to indicate any of the four virtual page numbers selected. In case, therefore, only one bank is present, only one entry is assigned to the four consecutive virtual pages. In the present embodiment, the maximum size of the virtual page is set to the N-th power of two of the minimum size, and the number of banks to be provided is also the N-th power of two. Specifically, the virtual page has its minimum size set to 1 KB and its maximum size set to the second power of two of the former, i.e., 4 KB, and the number of banks to be provided is the second power of two, i.e., four. Thus, as in the case of the page size of 4 KB, the translation lookaside buffer 1 can latch one hundred and twenty eight entries of an arbitrary virtual page number, as has the page size of 1 KB as a whole. However, the virtual page numbers of the entries to be retained in one bank is restricted to every 4 KB. This restriction exerts no influence upon the hit rate of the TLB 1 if the virtual page numbers of the entries retained by the translation lookaside buffer 1 are consecutive. This hit rate is influenced to some extent if the virtual page numbers are discrete. In this case, too, the influence can be reduced, if the virtual page of 1 KB is address-mapped for every 2 KB, and can be fully eliminated if address-mapped for every 4 KB. When the translation information having the page size of 1 KB is to be set in (or written to) the translation lookaside buffer 1, the four entries (E11), (E12), (E13) and (E14), as indicated by the index addresses of 5 bits, are set, from the four banks (11), (12), (13) and (14), respectively, with the translation information when the 2-bit vpn (11–10) is at "00", the translation information when the 2-bit vpn (11–10) is at "01", the translation information when the 2-bit vpn (11–10) is at "10", and the translation information when the 2-bit vpn (11–10) is at "11". Thus, it is possible to prevent the reduction of the hit rate.

The bit number of the address comparison for the hit decisions has to be changed according to the virtual page size, as described with reference to FIG. 12. In case the virtual page is at 1 KB, the vpn (11–10) has to be compared with the VPN (11–10) unlike the case of 4 KB. In order to cover all of such bit numbers of comparison targets, the TLB 1 is provided with the memory fields of the VPN (31–17) and the VPN (11–10) and with the memory field of 22 bits even for the physical page number PPN. The TLB 1 is also provided in the data part of each entry with the size bit SZ indicating the virtual page size to be supported thereby, so that the bit number for the address comparison for the bit decision is changed according to the value of the size bit. In the case of the size bit SZ=1 (i.e., the virtual page size=4 KB), as described with reference to FIG. 12, the VPN (31–17) are compared with the corresponding bits of the logical address. In the case of the size bit SZ=0 (i.e., the virtual page size=1 KB), the VPN (31–17) and the VPN (11–10) are compared with the corresponding bits of the logical address.

Thus, the microcomputer for supporting the plural page sizes selectively can easily satisfy the demand for improving the memory using efficiency for each process by making the sizes of the virtual pages relatively small, in case the total memory capacity of the real memory to be packaged in the system is small. At this time, the translation lookaside buffer 1 is enabled, by setting the maximum virtual page size to the power of two of the minimum size and by the number of banks of the set associative type TLB 1 to no less than the power of two, to latch the entries of any virtual page number on principle, even if the method of indexing the index address is unified into that for the maximum virtual page size and no matter whether the selected virtual page size might be the maximum or the minimum. If the information for indicating the size of the virtual page is provided to correspond to the virtual page number so that the bit number of the address comparison for the hit decision is changed by using that size, the number and position of the comparison target information for retrieving the translation lookaside buffer 1 associatively can be easily changed according to the size of the virtual page. If the translation lookaside buffer 1 for supporting the plural page sizes is realized by the set associative type cache memory, the chip occupation area and the power consumption can be reduced to halves of those of the case in which the same is constructed of the CAM.

<<Support of Plural Index Methods>>

In case there is supported a multiple virtual support in which a plurality of processes each having address translation informations so that the processes are discriminated by the address space identifier asid, the method of decoding only one portion (i.e., the index addresses) of the logical addresses, as shown in FIG. 2, and the method of decoding the result of modifying one portion (i.e. the index addresses) of the logical addresses with one portion of the present address space identifier asid by the exclusive OR gate XOR, as shown in FIG. 3, can be instructed as the method of designating the index addresses of the TLB 1 in accordance with the logical values of the bit MMUCR.IX of the register MMUCR. Thus, in the using mode in which many processes are started in parallel in the multiple virtual support, the index methods can be so selected according to the using mode as to suppress the reduction of the hit rate. If, moreover, one portion of the logical addresses is modified by the address space identifier asid using the logical addresses to index the buffer memory, the reduction of the hit rate can be suppressed in the using mode in which many processes are started in parallel in the multiple virtual support.

<<Degree of Freedom of Replacement>>

Figure 4:
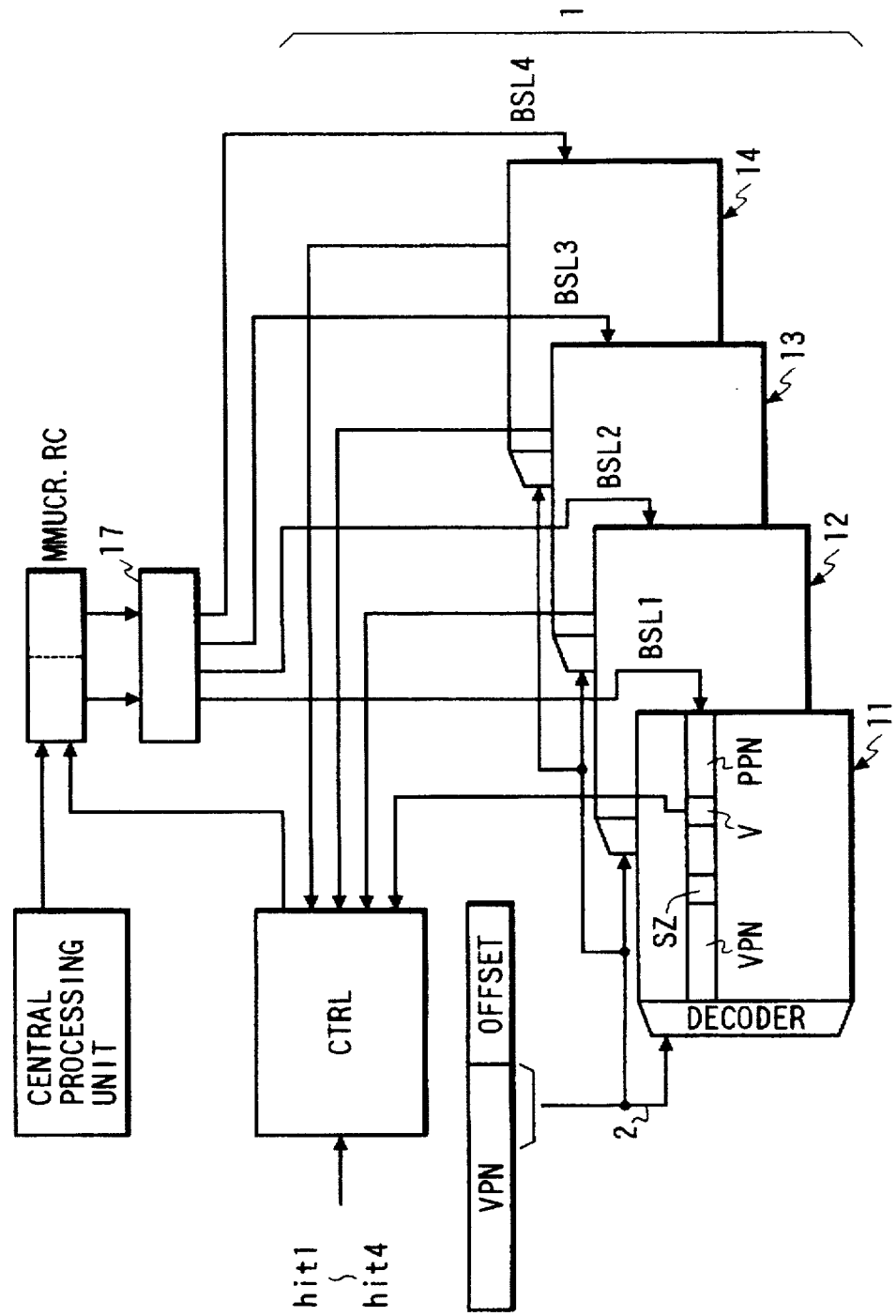
FIG. 4 is an explanatory diagram of a construction capable of deciding a bank, as is to be replaced, of a TLB entry arbitrarily by a software.

As described above, the TLB 1 is constructed as the 4-way set associative type cache memory which is provided with the plural banks 11 to 14 having their index addresses shared. In case the latched information is to be replaced from the plural banks (or ways) due to a cache miss, the bank to be replaced can be arbitrarily designated by executing the software by the central processing unit 3. In the register MMUCR shown in FIG. 6, the bit MMUCR.RC is a field to be set with the information of 2 bits for designating the aforementioned bank arbitrarily. This set value is decoded by a decoder 17 of FIG. 4 to generate signals (BSL1 to BSL4) for selecting one of the four banks 11 to 14. As a result, one of the entries in the four banks 11 to 14 designated by the index address 2 is selected by the aforementioned selection signals (BSL1 to BSL4) and is replaced. The bit MMUCR.RC can also be used as the counter means such as a random counter. The power of two of the bit number of the MMUCR.RC is equalized to the number (4) of the banks of the aforementioned buffer memory 1. The control circuit (CTRL) 50 designates the banks in accordance with the following predetermined rules, as has been described with reference to FIG. 15. In case the replacement of the latched information for the TLB 1 is required (for a TLB miss), the MMUCR.RC is incremented by one. If any bank latches the effective data in its indexed memory field (that is, the translation information V in each of the index entries latches the value 1), the incremented result is adopted as the bank number to be replaced. In case there is a bank having no effective data latched in its indexed memory field (that is, some of the indexed entries latches V=0), the bank number is set in the MMUCR.RC, and the bank having the set number is to be replaced. At this time, the individual bits of the MMUCR.RC are to have their values arbitrarily changed by the execution of the software by the central processing unit 3. Specifically, the MMUCR.RC is not restricted to the increment of +1 due to the occurrence of the TLB miss. The MMUCR.RC may be updated to exclude a specific value. Moreover, various replacements can be achieved depending upon the algorithm of the software to be executed by the CPU 3. For example, the random replacement, the FIFO replacement starting from the initially loaded one, and the LRU (Least Recently Used) replacement starting from the last referred one can be easily realized by changing the method of updating the MMUCR.RC. As a result, it is possible to warrant the degree of freedom of the replacement.

By not fixing these replacement algorithms for replacing the entries of the TLB 1 but making it possible to arbitrarily determine the banks to be replaced, it is possible for the data processing conveniences to satisfy the demand for latching a specific translation pair at all times as the entries in the translation lookaside buffer 1 and the demand for leaving a specific entry unreplaced.

<<Single Virtual Support and Multiple Virtual Support>>

In the microcomputer of the present embodiment, it is possible to select the multiple virtual support, in which the logical address is modified or expanded by the address space identifier asid, in case the plural processes to be executed individually have the address translation information all over the logical space, and the single virtual support, in which the logical address is neither modified nor expanded by the address space identifier asid in case the individual processes have the address translation information of the logical address space assigned thereto. The control of those virtual supports is instructed by the value of the MMUCR.SV, as exemplified in FIG. 6. The value of this MMUCR.SV is arbitrarily set by the execution of the software by the central processing unit 3. The conceptional differences between the single virtual support and the multiple virtual support have been described with reference to FIG. 20, and the remaining representative difference is exemplified in FIG. 19. As shown on FIG. 5, the TLB 1 is provided with the fields for not only the virtual page number VPN, the physical page number PPN and the address space identifier ASID. These fields have different values in dependence upon whether the virtual support is single or multiple. When the virtual page corresponding to the address space identifier contained in a TLB entry is set not to be shared by another process, the address space identifier ASID is used in the multiple virtual support for deciding the TLB hit/miss of the TLB 1, as described with reference to FIG. 17. Hence, the TLB hit is not determined unless the virtual page number VPN of the entry latched in the TLB 1 matches the virtual page address vpn and unless the address space identifier ASID of that entry matches the present address space identifier asid. In the single virtual support, the address space identifier ASID is used as the memory protecting information (or domain number). In the user mode, the access to the non-shared page by another process is processed as the TLB protection error exception by the software.

The using conveniences of the address translation mechanism can be improved by setting the value of the MMUCR.SV through the CPU 3 to support the single virtual support and the multiple virtual support selectively. The memory protection can be easily made complete by using the address space identifier ASID of the multiple virtual support as the memory protection information in the single virtual support.

Although our invention has been specifically described on the basis of its embodiments, it should not be limited thereto but can naturally be modified in various manners without departing from the gist thereof.

In the foregoing embodiment, for example, the way number, i.e., the bank number of the TLB can be increased to five or more such as eight. In case the page size is at 1 KB and 8 KB, for example, the way number (or bank number) of the TLB may be eight or more. Moreover, in case the page size is 4 KB or 16 KB, the way number (or bank number) of the TLB may be four or more. These modifications can achieve effects similar to those of the foregoing embodiment. In short, the maximum size of the pages to be supported is set to the power of two of the minimum size, and the set number of the set associative type buffer memory may be set to the power of two of the former or more. The size of the address space to be supported by the microcomputer should not be limited to 4 GB, nor is limited the bit number of the logical address. The page size to be supported can be suitably changed to a suitable size, and the number of kinds to be supported can also be suitably changed. Moreover, the virtual page number VPN to be latched as the TLB entry should not be restricted to the construction, from which is excluded the corresponding bits to be used for the index, as in the foregoing embodiment, but can latch all bits of the virtual page number as the TLB entry.

Although our invention has been described in case it is applied to the microcomputer providing its background, it should not be limited thereto but can be widely applied to a MMU (Memory Management Unit) controller chip, for example.

The effects to be obtained by the representative of the invention disclosed herein will be briefly described in the following.

Specifically, it is possible to realize a data processor capable of supporting a plurality of page sizes without increasing the chip occupation area and the power consumption. It is also possible to realize an address translation mechanism capable of selecting the index methods. The address translation pair to be replaced can be given the degree of freedom. This degree of freedom can also be given to the virtual memory type to be supported. Thanks to these, it is possible to realize a data processor which is provided with an address translation mechanism capable of satisfying the specifications demanded by the user and having usable conveniences.

What is claimed is:

1. A data processor having a virtual memory function in which a logical address space is divided into a plurality of virtual pages and a logical address is translated to a physical address at the page unit, comprising:

a buffer memory including a plurality of banks each of which includes a plurality of memory fields, each of said plurality of memory fields including virtual page information representing a virtual page, physical page information corresponding to the virtual page information and size information for the virtual page;

a selection circuit which selects a memory field from each of said plurality of banks in accordance with first logical address data, wherein the first logical address data comprises predetermined bits of the logical address; and a comparing circuit which compares the virtual page information in the selected memory field with second logical address data, wherein the second logical address data comprises bits of the logical address, wherein the bits of the logical address are determined in response to the size information in the selected memory field.

2. A data processor according to claim 1, wherein a size of said virtual page is set between a minimum size thereof and a maximum size thereof, and the maximum size is $N^2$ times the minimum size, and wherein the number of the banks of said buffer memory is no less than $N^2$.

3. A data processor according to claim 2, wherein the first logical address data for selecting the memory field from each of the banks have address locations fixed in the logical address, and wherein the fixed address locations are determined by the address locations in the logical address by which the memory field is selected from each of the banks when the virtual page has the maximum size.

4. A data processor according to claim 3, wherein the virtual page information stored in the memory field includes a field for storing first bits to be compared with the second logical address data if the virtual page has the maximum size, and a field for storing second bits which are not compared with the second logical address data if the virtual page has the maximum size and which are compared with the logical address data if the virtual page has the minimum size, and wherein whether or not the comparison for said second bits is reflected a hit decision is determined in accordance with the size information.

5. A data processor for supporting a virtual memory function in which a logical address space is divided into a plurality of virtual pages and a logical address is translated to a physical address at the page unit, comprising:

a set associative type cache memory having a plurality of banks each having a plurality of memory fields each of which includes a virtual page number for indicating a virtual page and a physical page number corresponding to the virtual pare number;

means for providing a control signal; and an index address generating circuit which receives at least a portion of the logical address and the control signal, wherein the index address generating circuit generates an index address for selecting a memory field from each of the plurality of banks, and wherein the index address generating circuit generates a different index address in accordance with the control signal.

6. A data processor according to claim 5, wherein said index address generating circuit includes a first circuit modifying said portion of the logical address based on information corresponding to a process using said logical address, and a second circuit providing said portion of the logical address or an output from the first circuit as the index address in accordance with the control signal.

7. A data processor including a central processing unit, and for supporting a virtual memory function in which a logical address space is divided into a plurality of virtual pages and a logical address from the central processing unit is translated to a physical address at the page unit, comprising:

a set associative type cache memory having a plurality of banks each having a plurality of memory fields each of which includes a virtual page number for indicating a virtual page and a physical page number corresponding to the virtual page number; and a designating circuit which is accessed by the central processing unit and which designates a bank including a memory field in which information is to be replaced, wherein the bank in which information is to be replaced is determined by software executed by the central processing unit.

8. A data processor according to claim 7, wherein the designating circuit includes a register in which information for designating the bank in which information is to be replaced is set by an execution of the software by said central processing unit.

9. A data processor for supporting a virtual memory function in which a logical address space is divided into a plurality of virtual pages and a logical address from the central processing unit is translated to a physical address at the page unit, comprising:

a set associative type cache memory having a plurality of banks each having a plurality of memory fields each of which includes a virtual page number for indicating a virtual page and a physical page number corresponding to the virtual page number;

a circuit designating one of the plurality of banks, which includes a memory field having information to be replaced according to a predetermined rule; and a central processing unit coupled to the circuit and changing the designation of said bank by said circuit in response to the central processing unit executing predetermined software.

10. A data processor according to claim 9, wherein the designating circuit includes a counter circuit and wherein said predetermined rule for designating the bank having information to be replaced includes incrementing said counter circuit in response to a request for replacing information of the set associative type cache memory, setting the incremented result as the bank having information to be replaced if each of the banks stores effective data, and setting said counter circuit with a bank which stores no effective data as the bank having information to be replaced if the set associative type cache memory includes a bank storing no effective data; and wherein the central processing unit changes the counter circuit in response to executing the predetermined software, wherein the designation of said bank is changed.

11. A data processor having a virtual memory function in which a logical address space is divided into a plurality of virtual pages, a logical address is translated to a physical address at the virtual page unit, and a plurality of processes are executed using the virtual memory function, comprising:

a multiple virtual mode in which the logical address is modified according to a process to be executed and each of said plurality of processes is capable of using an address over the logical address space;

a single virtual mode in which said logical address is unmodified according to a process to be executed, wherein each of the plurality of processes is capable of using an address in an address space assigned thereto within the logical address space and a portion of said logical address space is exclusively assigned among the plurality of processes to be executed; and a selector selecting either said multiple virtual mode or said single virtual mode.

12. A data processor according to claim 11, wherein each of the plurality of processes is represented by a process number, and the process number in said multiple virtual mode is used as memory protecting information in said single virtual mode.

13. A data processor according to claim 11, further comprising:

a register storing information to select either said multiple virtual mode or said single virtual mode; and a central processing unit setting the information in said register in response to executing predetermined software.

14. A data processor having a virtual memory function in which a logical address space of a central processing unit is divided into a plurality of virtual pages, a logical address is translated to a physical address at the virtual page unit, and a plurality of processes are executed using the virtual memory function, comprising:

mode information designating an operation mode of the central processing unit, wherein the central processing unit operates in either a privileged mode or a user mode;

control information designating a virtual memory mode which is either a multiple virtual mode or a single virtual mode in which each of said plurality of processes is capable of using an address over the logical address space in the multiple virtual mode and a logical address is modified according to a process using the logical address, and in which each of the plurality of processes is exclusively assigned portions of the logical address space in the single virtual mode and each of the plurality of processes is capable of using an address in an address portion assigned thereto without modifying the address by the process;

a translation lookaside buffer accessed by using at least a portion of the logical address as an index address, and having a plurality of fields each of which includes process information for representing a process, a virtual page information representing a virtual page corresponding to said process, physical page information corresponding to the virtual page information, and share information indicating whether or not the virtual page corresponding to said process is shared with another process; and a control circuit for said translation lookaside buffer, wherein the control circuit uses the process information in a hit decision of the translation lookaside buffer if said share information designates a non-share condition, and wherein the control circuit uses said process information as memory protection information if said mode information represents the user mode of the central processing unit, the control information represents the single virtual mode and said share information represents the non-share condition.

15. A data processor having a virtual memory function in which a logical address space is divided into a plurality of virtual pages and a logical address is translated at the page unit to a physical address, comprising:

a processing unit generating the logical address which includes an index address, a comparison address and an offset address; and a translation lookaside buffer translating the logical address generated by said processing unit to a physical address, wherein said translation lookaside buffer includes:

a plurality of banks each having a plurality of entries each of which includes a virtual page number indicating a virtual page, size information indicating a size of said virtual page, and a physical page number corresponding to said virtual page number;

a selector selecting an entry designated by said index address from each of said plurality of banks in response to said index address; and a comparator comparing the virtual page number from the selected entry with said comparison address, wherein a bit number of the virtual page number to be compared is decided by the size information in the selected entry, and wherein said physical address is generated from said physical page number in said selected entry and said offset address.

16. A data processor according to claim 15, wherein said processor and said translation lookaside buffer are formed on a semiconductor chip.

17. A data processor according to claim 16, wherein a first size of the virtual page is the N-th power of two of a second size of the virtual page, and wherein a number of said banks is no more than said N-th power of two.

18. A data processor according to claim 16, wherein the data processor executes a plurality of processes using the virtual memory function, the data processor further comprising:

a first control bit settable by said processor, and a register for outputting a process number to indicate a process among the plurality of processes, and wherein said selector modifies said index address with a portion of said process number and selects an entry by using the modified index address if said first control bit is set in a first status, and said selector selects an entry by using said index address if said first control bit is set in a second status.

19. A data processor according to claim 18, wherein said selector includes an exclusive logical circuit receiving said index address and the portion of said process number and a decoder decoding either an output of said exclusive logical circuit or said index address in accordance with said first control bit.

20. A data processor according to claim 18, wherein said each of plurality of entries includes a process number to be compared with said process number from the register.

21. A data processor according to claim 16, further comprising:

a first control bit settable by said processor, and a second selector designating one of said plurality of banks in accordance with said first control bit if no effective information is stored in one of the entries selected by said index address, wherein a physical page number is written in the entry which is designated by said index address and which is included in the bank designated by the second selector, wherein the information in said entry is replaced in said translation lookaside buffer.

22. A data processor according to claim 16, wherein the data processor executes a plurality of processes using the virtual memory function, further comprising a register storing a process number for specifying a process among the plurality of processes, wherein each of the plurality of entries includes a process field for storing a process number to specify a process, and a share field for storing share information indicating whether or not a virtual page indicated by a virtual page number stored in the entry is shared among the plurality of processes, and wherein it is decided by said share information whether a comparison between the process number stored in said register and the process number stored in said process field is executed in the comparison by said comparator.

23. A data processor having a virtual memory function in which a logical address space is divided into a plurality of virtual pages and a logical address is translated at the page unit to a physical address, and which executes a plurality of processes under the virtual memory function, comprising:

a processing unit generating the logical address which comprises an index address, a comparison address and an offset address;

a circuit outputting a process number to specify a process among the plurality of processes;

a circuit settable by said processing unit and outputting index information for specifying an index;

a translation lookaside buffer which translates the logical address generated by said processing unit to a physical address, and which includes:

a plurality of banks each having a plurality of entries each of which includes a virtual page number for indicating a virtual page, and a physical page number corresponding to said virtual page number;

a selector which selects either said index address in the logical address or an index address which is obtained by modifying said index address in the logical address by said process number, in accordance with said index information, and which selects an entry designated by the selected index address from each of said plurality of banks; and a comparator comparing a virtual page number from the selected entry with said comparison address, wherein said physical address is generated from said physical page number in said entry and said offset address.

24. A data processor according to claim 23, wherein said data processor is formed on a semiconductor chip.

25. A data processor having a virtual memory function in which a logical address space is divided into a plurality of virtual pages and a logical address is translated at the page unit to a physical address, comprising:

a processing unit for generating the logical address which comprises an index address, a comparison address and an offset address;

a bank designating circuit settable by said processing unit;

a translation lookaside buffer which translates said logical address generated by said processing unit a physical address, and which includes:

a plurality of banks each having a plurality of entries each of which comprises a virtual page number for representing the virtual page, and a physical page number corresponding to said virtual page number;

a selector selecting an entry designated by said index address from each of said plurality of banks in response to said index address;

a comparator comparing a virtual page number from the selected entry with said comparison address; and a bank selector designating a bank which is designated by said bank designation circuit to execute a replacement of an entry if said comparator indicates that a virtual page number corresponding to said comparison address is not stored in the selected entry, wherein said physical address is generated from said physical page number in said entry and said offset address.

26. A data processor according to claim 25, wherein said data processor is formed on a semiconductor chip.

27. A data processor having a virtual memory function in which a logical address space is divided into a plurality of virtual pages and a logical address is translated at the page unit to a physical address, and which executes a plurality of processes, comprising:

a processing unit for generating the logical address having an index address, a comparison address and an offset address;

a register settable with a process number for specifying a process among the plurality of processes by the processing unit; and a translation lookaside buffer which translates the logical address generated by said processing unit to a physical address and which includes:

a plurality of entries each of which stores a virtual page number for representing the virtual page, a physical page number corresponding to said virtual page number, a process number for specifying a process, and common information indicating whether or not the virtual page represented by said virtual page number is shared among processes;

a selector selecting an entry designated by said index address; and a comparator which compares a virtual page number from the selected entry with said comparison address, wherein it is determined by the common information whether or not a comparison between the process number stored in said register and the process number in the selected entry by the comparator is executed, wherein said physical address is generated from said physical page number in said entry and said offset address.

28. A data processor according to claim 27, wherein said data processor is formed on a semiconductor chip.

29. A data processor according to claim 1, wherein a size of the virtual page is settable to a maximum size thereof and a minimum size thereof, and wherein the relationship among the number of banks, the maximum size and the minimum size is represented by $N \geq Smax/Smin$, wherein N represents the number of banks, Smax represents the maximum size, and Smin represents the minimum size.

30. A data processor according to claim 16, wherein a size of the virtual page is settable to a first size thereof and a second size thereof, and wherein the relationship among a number of banks, the first size and the second size is represented by $N \geq S1st/S2nd$, wherein N represents the number of banks, S1st represents the first size, and S2nd represents the second size.

* * * * *

UNITED STATES PATENT AND TRADEMARK OFFICE
CERTIFICATE OF CORRECTION

PATENT NO. : 5,796,978
DATED : August 18, 1998
INVENTOR(S) : Shinichi Yoshioka; Ikuya Kawasaki; Susumo Narita; Saneaki Tamaki It is certified that error appears in the above-identified patent and that said Letters Patent is hereby corrected as shown below:

Column 25, line 45, delete "pare" and insert --page--.

Signed and Sealed this

Fifteenth Day of December, 1998

Attest:

BRUCE LEHMAN

*Attesting Officer*  *Commissioner of Patents and Trademarks*